(12) United States Patent
Higashida et al.

(10) Patent No.: US 10,656,110 B2
(45) Date of Patent: May 19, 2020

(54) TEMPERATURE CONTROL SYSTEM, TEMPERATURE CONTROL DEVICE AND REFRIGERATION DEVICE

(71) Applicant: SHINWA CONTROLS CO., LTD, Kawasaki-Shi (JP)

(72) Inventors: Kazunari Higashida, Kawasaki (JP); Hirofumi Komori, Kawasaki (JP); Yoshiyuki Okamoto, Kawasaki (JP); Hideaki Furumoto, Kawasaki (JP); Tomoaki Ito, Kawasaki (JP); Hiroki Mori, Kawasaki (JP); Go Shiotsuki, Kawasaki (JP); Kouji Suzuki, Kawasaki (JP)

(73) Assignee: Shinwa Controls Co., Ltd., Kawasaki-Shi (JP)

( * ) Notice: Subject to any disclaimer, the term of this patent is extended or adjusted under 35 U.S.C. 154(b) by 46 days.

(21) Appl. No.: 16/069,017

(22) PCT Filed: Jan. 20, 2017

(86) PCT No.: PCT/JP2017/001897
§ 371 (c)(1),
(2) Date: Jul. 10, 2018

(87) PCT Pub. No.: WO2017/130858
PCT Pub. Date: Aug. 3, 2017

(65) Prior Publication Data
US 2019/0017949 A1    Jan. 17, 2019

(30) Foreign Application Priority Data

Jan. 26, 2016  (JP) ................................. 2016-012476

(51) Int. Cl.
*F25B 29/00*  (2006.01)
*G01N 25/72*  (2006.01)
(Continued)

(52) U.S. Cl.
CPC ............... *G01N 25/72* (2013.01); *F25B 7/00* (2013.01); *F25B 25/005* (2013.01); *F25B 41/04* (2013.01);
(Continued)

(58) Field of Classification Search
CPC .......... F25B 41/04; F25B 25/005; F25B 7/00; F25B 49/02; G01N 25/72; G05D 23/1919
(Continued)

(56) References Cited

U.S. PATENT DOCUMENTS 9,739,514 B2   8/2017  Seki et al.
2006/0225876 A1  10/2006  Shimizu
(Continued)

FOREIGN PATENT DOCUMENTS

CN    101084403 A    12/2007
EP    0 344 397 A2   12/1989
(Continued)

OTHER PUBLICATIONS

Extended European Search Report (Application No. 16803542.6) dated Mar. 14, 2019.
(Continued)

*Primary Examiner* — Davis D Hwu
(74) *Attorney, Agent, or Firm* — Burr & Brown, PLLC

(57) ABSTRACT

A temperature control system includes first and second temperature control devices. In the first temperature control device, a refrigeration circuit of a refrigeration device, which is positioned downstream of an expansion valve and upstream of an evaporator, and a brine circulation path of a brine circulation device, which is positioned on a heating unit, constitutes a refrigeration capacity adjustment mechanism, and cooling is performed by the evaporator of the refrigeration circuit. In the second temperature control device, a refrigeration device includes an injection circuit
(Continued)

that bypasses a condensed refrigerant upstream of a compressor, and a hot gas circuit that bypasses a compressed high-temperature refrigerant upstream of a compressor. A part of the brine circulation path of the brine circulation device and an evaporator of the refrigeration device constitute a heating capacity adjustment heat exchanger, and heating or cooling is performed by a load unit of the brine circulation path.

12 Claims, 5 Drawing Sheets

(51) Int. Cl.
| | |
|---|---|
| F25B 41/04 | (2006.01) |
| F25B 49/02 | (2006.01) |
| F25B 25/00 | (2006.01) |
| F25B 7/00 | (2006.01) |
| G05D 23/19 | (2006.01) |
| F25B 40/00 | (2006.01) |
| F25B 5/04 | (2006.01) |

(52) U.S. Cl.
CPC ......... *F25B 49/02* (2013.01); *G05D 23/1919* (2013.01); *F25B 5/04* (2013.01); *F25B 40/00* (2013.01); *F25B 2339/047* (2013.01); *F25B 2400/0409* (2013.01); *F25B 2400/061* (2013.01); *F25B 2600/0251* (2013.01); *F25B 2600/0261* (2013.01); *F25B 2600/13* (2013.01); *F25B 2600/2501* (2013.01); *F25B 2600/2509* (2013.01); *F25B 2700/1933* (2013.01); *F25B 2700/21151* (2013.01)

(58) Field of Classification Search
USPC .......................................................... 165/201
See application file for complete search history.

(56) References Cited

U.S. PATENT DOCUMENTS

| | | | |
|---|---|---|---|
| 2007/0199337 A1* | 8/2007 | Otake | F24D 17/02 62/183 |
| 2009/0205344 A1 | 8/2009 | Ascani | |
| 2012/0023979 A1 | 2/2012 | Taylor et al. | |
| 2012/0241139 A1* | 9/2012 | Katoh | F28D 1/0426 165/202 |
| 2016/0201956 A1* | 7/2016 | Tamura | F25B 19/00 62/157 |

FOREIGN PATENT DOCUMENTS

| | | |
|---|---|---|
| EP | 1 828 693 A1 | 9/2007 |
| EP | 3 306 228 A1 | 4/2018 |
| JP | S52-101753 A1 | 8/1977 |
| JP | S59-162645 U | 10/1984 |
| JP | H02-300101 A1 | 12/1990 |
| JP | H05-215412 A | 8/1993 |
| JP | H10-026485 A1 | 1/1998 |
| JP | H10-038393 A1 | 2/1998 |
| JP | H10-197077 A1 | 7/1998 |
| JP | 2002-346403 A1 | 12/2002 |
| JP | 2003-056495 A1 | 2/2003 |
| JP | 2003-185292 A1 | 7/2003 |
| JP | 2004-271534 A1 | 9/2004 |
| JP | 2005-351515 A1 | 12/2005 |
| JP | 2006-284063 A1 | 10/2006 |
| JP | 2006-285454 A1 | 10/2006 |
| JP | 2006-292204 A1 | 10/2006 |
| JP | 2007-240105 A1 | 9/2007 |
| JP | 2008-075919 A1 | 4/2008 |
| JP | 2008-075920 A | 4/2008 |
| JP | 2008-524624 A1 | 7/2008 |
| JP | 2009-109065 A1 | 5/2009 |
| JP | 2011-033295 A1 | 2/2011 |
| JP | 2012-077971 A | 4/2012 |
| JP | 2013-024453 A1 | 2/2013 |
| JP | 2014-098521 A1 | 5/2014 |
| JP | 2015-068630 A1 | 4/2015 |
| WO | 2004/111558 A1 | 12/2004 |
| WO | 2014-076891 A1 | 5/2014 |
| WO | 2015/125669 A1 | 8/2015 |
| WO | 2016/195111 A1 | 12/2016 |

OTHER PUBLICATIONS

English translation of International Preliminary Report on Patentability (Chapter I) (Application No. PCT/JP2016/066777) dated Dec. 14, 2017, 10 pages.
Japanese Office Action (with English translation), Japanese Application No. 2016-012469, dated Aug. 2, 2019 (9 pages).
Japanese Office Action (Application No. 2016-012448) dated Jul. 30, 2019 (with English translation).
Korean Office Action (Application No. 10-2018-7000422) dated May 30, 2019 (with English translation).
International Search Report and Written Opinion (Application No. PCT/JP2017/001897) dated Apr. 18, 2017.
English translation of International Preliminary Report on Patentability (Chapter I) (Application No. PCT/JP2017/001897) dated Aug. 9, 2018, 13 pages.
Chinese Office Action (Application No. 201780007939.2) dated Dec. 26, 2019.

\* cited by examiner

TEMPERATURE CONTROL SYSTEM, TEMPERATURE CONTROL DEVICE AND REFRIGERATION DEVICE

TECHNICAL FIELD

The present invention relates to a temperature control system for performing temperature control by cooling and heating. In addition, the present invention relates to a temperature control device and a refrigeration device that can be used in such a temperature control system.

BACKGROUND ART

For example, in a temperature control system in which a specimen is subjected to a cycle test of large temperature difference, a multi-way refrigeration device having a plurality of refrigeration circuits is generally used (see, e.g., Patent Document 1). Since the multi-way refrigeration device can generally perform temperature control lower than that of a one-way refrigeration device, the multi-way refrigeration device is used when the temperature control at ultra-low temperature, such as not more than −40° C., is performed. On the other hand, as to a heating device, there are employed a structure in which a space whose temperature is to be controlled (temperature controlled space) or an object whose temperature is to be controlled (temperature controlled object) is directly heated by an electric heater, a structure in which a temperature controlled space or a temperature controlled object is heated by a brine heated by a heater, etc.

Patent Document 1: JP2007-240105A

SUMMARY OF INVENTION

Technical Problem

A specimen to be subjected to a cycle test of large temperature difference may be, for example, a hydrogen tank of a fuel cell vehicle. Fuel cell vehicles are expected to be widely used in many areas. In order to achieve this, tests are needed to be conducted to a hydrogen tank under various supposed environments. It is required for such a temperature control system to be capable of ensuring a sufficiently wide temperature control range, and to be capable of flexibly and stably controlling a temperature of a specimen to a desired temperature.

The present invention has been made in view of the above circumstances. The object of the present invention is to provide a temperature control system that is capable of ensuring a sufficiently wide temperature control range from a low temperature to a high temperature, and is capable of controlling a temperature of a temperature controlled space or a temperature controlled object to a desired temperature in a simple and reliable way.

In addition, the object of the present invention is to provide a temperature control device that can widely adjust a refrigeration capacity of a refrigeration circuit in a simple way, without operating any constituent element of the refrigeration circuit.

In addition, the object of the present invention is to provide a refrigeration device capable of stably controlling a temperature, and a temperature control device including the same.

Solution to Solve Problem

The temperature control system of the present invention is a temperature control system that controls a temperature of a temperature controlled space or a temperature controlled object, the temperature control system comprising a first temperature control device and a second temperature control device, wherein:

the first temperature control device includes a low-temperature-side refrigeration device and a low-temperature-side brine circulation device;

the first low-temperature-side refrigeration device includes a first low-temperature-side refrigeration circuit in which a first low-temperature-side compressor, a first low-temperature-side condenser, a first low-temperature-side expansion valve and a first low-temperature-side evaporator are connected such that a first low-temperature-side refrigerant is circulated therethrough in this order;

the low-temperature-side brine circulation device includes a low-temperature-side brine circulation path for circulating a low-temperature-side brine, and a low-temperature-side heating unit that constitutes a part of the low-temperature-side brine circulation path and is capable of heating the low-temperature-side brine received therein;

a portion of the first low-temperature-side refrigeration circuit, which is positioned on the downstream side of the first low-temperature-side expansion valve and on the upstream side of the first low-temperature-side evaporator, and a portion of the low-temperature-side brine circulation path, which is positioned on the downstream side of the low-temperature-side heating unit, constitute a refrigeration capacity adjustment mechanism in which they can exchange heat with each other;

the first low-temperature-side evaporator is capable of causing the first low-temperature-side refrigerant flowing through the first low-temperature-side evaporator to absorb heat of the temperature controlled space or the temperature controlled object;

the second temperature control device includes a high-temperature-side refrigeration device and a high-temperature-side brine circulation device;

the high-temperature-side refrigeration device includes:
a high-temperature-side refrigeration circuit in which a high-temperature-side compressor, a high-temperature-side condenser, a high-temperature-side expansion valve and a high-temperature-side evaporator are connected such that a high-temperature-side refrigerant is circulated therethrough in this order;
an injection circuit which includes: an injection flow path that communicates a portion of the high-temperature-side refrigeration circuit, which is positioned on the downstream side of the high-temperature-side condenser and on the upstream side of the high-temperature-side expansion valve, and a portion of the high-temperature-side refrigeration circuit, which is positioned on the downstream side of the high-temperature-side evaporator and on the upstream side of the high-temperature-side compressor, such that the high-temperature-side refrigerant can flow therethrough; and an injection valve capable of adjusting a flow rate of the high-temperature-side refrigerant flowing through the injection flow path; and
a hot gas circuit which includes: a hot-gas flow path that communicates a portion of the high-temperature-side refrigeration circuit, which is positioned on the downstream side of the high-temperature-side compressor and on the upstream side of the high-temperature-side condenser, and a portion of the injection fluid path, which is positioned on the downstream side of the injection valve, such that the high-temperature-side refrigerant can flow therethrough; and a hot gas valve capable of adjusting a flow rate of the high-temperature-side refrigerant flowing through the hot-gas flow path;

the high-temperature-side brine circulation device includes: a high-temperature-side brine circulation path for circulating a high-temperature-side brine; a high-temperature-side heating unit that constitutes a part of the high-temperature-side brine circulation path and is capable of heating the high-temperature-side brine received therein; and a load unit that constitutes a part of the high-temperature-side brine circulation path on the downstream side of the high-temperature-side heating unit, and is capable of causing heat of the high-temperature-side brine received therein to be released to the temperature controlled space or the temperature controlled object, or is capable of causing the high-temperature-side brine to absorb heat of the temperature controlled space or the temperature controlled object; and a part of the high-temperature-side brine circulation path and the high-temperature-side evaporator of the high-temperature-side refrigeration device constitute a heating capacity adjustment heat exchanger in which they can exchange heat with each other.

According to the temperature control system of the present invention, in the first temperature control device, the first low-temperature-side refrigerant can be heated by the low-temperature-side brine at the portion of the first low-temperature-side refrigeration circuit of the low-temperature-side refrigeration device on the upstream side of the first low-temperature-side evaporator. At this time, the refrigeration capacity of the first low-temperature-side evaporator can be adjusted depending on the heating capacity of the low-temperature-side brine. Thus, the refrigeration capacity of the low-temperature-side refrigeration circuit can be easily adjusted over a wide range, without operating any constituent element of the refrigeration circuit.

In addition, in the second temperature control device, the high-temperature-side refrigerant condensed by the high-temperature-side condenser can be bypassed to the downstream side of the high-temperature-side evaporator thorough the injection circuit, in order that the high-temperature-side refrigerant does not flow into the high-temperature-side evaporator, as well as the high-temperature-side refrigerant of a high temperature discharged by the high-temperature-side compressor can be bypassed to the downstream side of the high-temperature-side evaporator through the hot gas circuit. Thus, the flow rate of the high-temperature-side refrigerant to flow into the high-temperature-side evaporator can be controlled, whereby the refrigeration capacity outputted by the high-temperature-side evaporator can be flexibly adjusted. At this time, since there is no possibility that the high-temperature-side refrigerant to flow into the high-temperature-side evaporator is mixed with the high-temperature-side refrigerant of a high pressure, the refrigeration capacity to be outputted can be made stable. In addition, by adjusting a ratio between the condensed high-temperature-side refrigerant to be bypassed through the injection circuit and the high-temperature-side refrigerant of a high temperature to be bypassed through the hot gas circuit, the condition and the temperature of the high-temperature-side refrigerant to flow into the high-temperature-side compressor can be easily controlled into a desired condition. Thus, the temperature control can be stably performed, while flexibly adjusting the refrigeration capacity. Accordingly, the temperature of the high-temperature-side brine of the high-temperature-side brine circulation device can be controlled by the stably adjusted refrigeration capacity outputted by the high-temperature-side refrigeration device, so that the heating capacity or the refrigeration capacity of the load unit can be adjusted. As a result, the stable temperature control can be performed by the load unit.

Then, by differentiating the temperature control range of the first temperature control device from that of the second temperature control device, a sufficiently wide temperature control range from a low temperature to a high temperature can be ensured.

The temperature control system of the present invention may further comprise a control unit that controls the first temperature control device and the second temperature control device, wherein:

when the temperature of the temperature controlled space or the temperature controlled object is controlled to a desired temperature in a low temperature range, the control unit causes the first low-temperature-side refrigerant to be circulated in the low-temperature-side refrigeration device, causes the low-temperature-side brine to be circulated in the low-temperature-side brine circulation device and causes the high-temperature-side brine to be circulated in the high-temperature-side brine circulation device, while the control unit does not cause the high-temperature-side refrigerant to be circulated in the high-temperature-side refrigeration device;

when the temperature of the temperature controlled space or the temperature controlled object is controlled to a desired temperature in a middle temperature range that is set higher than the low temperature range, the control unit does not cause the first low-temperature-side refrigerant to be circulated in the low-temperature-side refrigeration device and does not cause the low-temperature-side brine to be circulated in the low-temperature-side brine circulation device, while the control unit causes the high-temperature-side refrigerant to be circulated in the high-temperature-side refrigeration device and causes the high-temperature-side brine to be circulated in the high-temperature-side brine circulation device; and when the temperature of the temperature controlled space or the temperature controlled object is controlled to a desired temperature in a high temperature range that is set higher than the middle temperature range, the control unit does not cause the first low-temperature-side refrigerant to be circulated in the low-temperature-side refrigeration device and does not cause the low-temperature-side brine to be circulated in the low-temperature-side brine circulation device, while the control unit causes the high-temperature-side refrigerant to be circulated in the high-temperature-side refrigeration device, and causes the high-temperature-side brine to be circulated in the high-temperature-side brine circulation device, with increasing a flow rate of the high-temperature-side brine to be circulated in the high-temperature-side brine circulation device as compared with a flow rate in the case of the middle temperature range.

In this case, when a temperature control of the low temperature range, in which a temperature is controlled to a desired temperature in the low temperature range by circulating the first low-temperature-side refrigerant in the low-temperature-side refrigerant device and by circulating low-temperature-side brine in the low-temperature-side brine circulation device, is carried out, by circulating the high-temperature-side brine in the high-temperature-side brine circulation device, thereby, in the case that the temperature control of the low temperature range is switched to a temperature control of the middle temperature range or the high temperature range, the temperature control by means of the high-temperature-side brine can be rapidly performed. Thus, a time required for reaching a desired temperature in the middle temperature range or the high temperature range from the low temperature range can be effectively reduced. In addition, when the temperature control is switched from the middle temperature range to the high temperature range, a flow rate of the high-temperature-side brine to be circulated in the high-temperature-side brine circulation device is increased as compared with the flow rate in the case of the middle temperature range. Thus, a time required for reaching a desired temperature in the high temperature range from the middle temperature range can be effectively reduced.

In the temperature control system of the present invention, in the first temperature control device, a portion of the first low-temperature-side refrigeration circuit, which is positioned on the downstream side of the first low-temperature-side expansion valve and on the upstream side of the first low-temperature-side evaporator, and a portion of the first low-temperature-side refrigeration circuit, which is positioned on the downstream side of the first low-temperature-side evaporator and on the upstream side of the first low-temperature-side compressor, may constitute an internal heat exchanger in which they can exchange heat with each other; and the internal heat exchanger may be located on the upstream side of the refrigeration capacity adjustment mechanism in a direction along which the first low-temperature-side refrigerant flows.

In this case, since the first low-temperature-side refrigerant, which has passed through the first low-temperature-side evaporator to have a higher temperature, is cooled by the first low-temperature-side refrigerant of a low temperature discharged by the first low-temperature-side expansion valve, before the first low-temperature-side refrigerant is sucked into the first low-temperature-side compressor, it can be prevented that the first low-temperature-side refrigerant having an excessive degree of superheating is sucked into the first low-temperature-side compressor. Thus, thermal decomposition of the first low-temperature-side refrigerant and burnout of the first low-temperature-side compressor can be prevented, to thereby improve stability in temperature control.

Above all, when cooling by the first temperature control device is performed after heating by the second temperature control device has been performed, there is a high possibility that the first low-temperature-side refrigerant, which was heat-exchanged in the first low-temperature-side evaporator of the first temperature control device, has an excessive degree of superheating. However, such a first low-temperature-side refrigerant can be prevented from being sucked into the first low-temperature-side compressor. Thus, excellent stability in temperature control in the system using both the first temperature control device and the second temperature control device can be ensured.

In addition, in the temperature control system of the present invention, the second temperature control device may further include a supercooling circuit which includes: a supercooling bypass flow path that communicates a portion of the high-temperature-side refrigeration circuit, which is positioned on the downstream side of the high-temperature-side condenser and on the upstream side of a position connected to the injection flow path, and a portion of the high-temperature-side refrigeration circuit, which is positioned on the high-temperature-side compressor or on the upstream side of the high-temperature-side compressor and on the downstream side of the high-temperature-side evaporator, such that the high-temperature-side refrigerant can flow therethrough; and a supercooling control valve that controls a flow rate of the refrigerant flowing through the supercooling bypass flow path; and a portion of the supercooling bypass flow path, which is positioned on the downstream side of the supercooling control valve, and a portion of the high-temperature-side refrigeration circuit, which is positioned on the downstream side of a position connected to the supercooling bypass flow path and on the upstream side of a position connected to the injection flow path, may constitute a supercooling heat exchanger in which they can exchange heat with each other.

In this case, since the refrigeration capacity of the high-temperature-side refrigerant can be increased by the supercooling heat exchanger, the adjustment range of the refrigeration capacity can be enlarged. In addition, since the high-temperature-side refrigerant discharged from the supercooling heat exchanger can be bypassed through the injection circuit, the temperature of the high-temperature-side refrigerant of a high temperature, which is bypassed to the downstream side of the high-temperature-side evaporator through the hot gas circuit, can be effectively lowered.

Above all, when heating by the second temperature control device is performed after cooling by the first temperature control device has been performed, in the absence of the supercooling heat exchanger, there is a high possibility that the high-temperature-side refrigerant, which is heat-exchanged with the high-temperature-side brine in the high-temperature-side evaporator of the second temperature control device, cannot sufficiently ensure a degree of superheating so that the refrigeration capacity is lowered. However, since there exists the supercooling heat exchanger, the refrigeration capacity can be compensated. Thus, undesired lowering of the refrigeration capacity in the high-temperature-side evaporator can be prevented, whereby excellent stability in temperature control in the system using both the first temperature control device and the second temperature control device can be ensured.

In addition, a temperature control device of the present invention comprises: a refrigeration device including a first refrigeration circuit in which a first compressor, a first condenser, a first expansion valve and a first evaporator are connected such that a first refrigerant is circulated therethrough in this order; and a brine circulation device including a brine circulation path for circulation a brine, and a heating unit that constitutes a part of the brine circulation path and is capable heating the brine received therein; wherein a portion of the first refrigeration circuit, which is positioned on the downstream side of the first expansion valve and on the upstream side of the first evaporator, and a portion of the brine circulation path, which is positioned on the downstream side of the heating unit, constitute a refrigeration capacity adjustment mechanism in which they can exchange heat with each other.

According to the temperature control device of the present invention, the first refrigerant can be heated by the brine at the portion of the first refrigeration circuit of the refrigeration device on the upstream side of the first evaporator. At this time, the refrigeration capacity of the first evaporator can be adjusted depending on the heating capacity of the brine. Thus, the refrigeration capacity of the first refrigeration circuit can be easily adjusted over a wide range, without operating any constituent element of the refrigeration circuit.

In the temperature control device of the present invention, a portion of the first refrigeration circuit, which is positioned on the downstream side of the first expansion valve and on the upstream side of the first evaporator, and a portion of the first refrigeration circuit, which is positioned on the downstream side of the first evaporator and on the upstream side of the first compressor, may constitute an internal heat exchanger in which they can exchange heat with each other; and the internal heat exchanger may be located on the upstream side of the refrigeration capacity adjustment mechanism in a direction along which the first refrigerant flows.

In this case, since the first refrigerant, which has passed through the first evaporator to have a higher temperature, is cooled by the first refrigerant of a low temperature discharged by the first expansion valve, before the first refrigerant is sucked into the first compressor, it can be prevented that the first refrigerant having an excessive degree of superheating is sucked into the first compressor. Thus, thermal decomposition of the first refrigerant and burnout of the first compressor can be prevented, to thereby improve stability in temperature control.

In addition, in the temperature control device of the present invention, the refrigeration device may be a two-way refrigeration device, and further may include a second refrigeration circuit in which a second compressor, a second condenser, a second expansion valve and a second evaporator are connected such that a second refrigerant is circulated therethrough in this order; and the first condenser and the second evaporator may constitute a cascade condenser in which they can exchange heat with each other.

In this case, as compared with a low-temperature-side refrigeration device of a one-way type, the refrigeration device can have a higher refrigeration capacity, and a controllable temperature range can be enlarged. Thus, a temperature range that can be controlled by the temperature control device can be increased, to thereby enhance versatility of the temperature control device.

In addition, a refrigeration device of the present invention comprises:

a refrigeration circuit in which a compressor, a condenser, an expansion valve and an evaporator are connected such that a refrigerant is circulated therethrough in this order;

an injection circuit which includes: an injection flow path that communicates a portion of the refrigeration circuit, which is positioned on the downstream side of the condenser and on the upstream side of the expansion valve, and a portion of the refrigeration circuit, which is positioned on the downstream side of the evaporator and on the upstream side of the compressor, such that the refrigerant can flow therethrough; and an injection valve capable of adjusting a flow rate of the refrigerant flowing through the injection flow path; and a hot gas circuit which includes: a hot-gas flow path that communicates a portion of the refrigeration circuit, which is positioned on the downstream side of the compressor and on the upstream side of the condenser, and a portion of the injection flow path, which is positioned on the downstream side of the injection valve, such that the refrigerant can flow therethrough; and a hot gas valve capable of adjusting a flow rate of the refrigerant flowing through the hot-gas flow path.

According to the refrigeration device of the present invention, the refrigerant condensed by the condenser can be bypassed to the downstream side of the evaporator thorough the injection circuit, in order that the refrigerant does not flow into the evaporator, as well as the refrigerant of a high temperature discharged by the compressor can be bypassed to the downstream side of the evaporator through the hot gas circuit. Thus, the flow rate of the refrigerant to flow into the evaporator can be controlled, whereby the refrigeration capacity outputted by the evaporator can be flexibly adjusted. At this time, since there is no possibility that the refrigerant to flow into the evaporator is mixed with the refrigerant of a high pressure, the refrigeration capacity to be outputted can be made stable. In addition, by adjusting a ratio between the condensed refrigerant to be bypassed through the injection circuit and the refrigerant of a high temperature to be bypassed through the hot gas circuit, the condition and the temperature of the refrigerant to flow into the compressor can be easily controlled into a desired condition. Thus, the temperature control can be stably performed, while flexibly adjusting the refrigeration capacity.

The refrigeration device of the present invention may further comprise a supercooling circuit which includes: a supercooling bypass flow path that communicates a portion of the refrigeration circuit, which is positioned on the downstream side of the condenser and on the upstream side of a position connected to the injection flow path, and a portion of the refrigeration circuit, which is positioned on the compressor or on the upstream side of the compressor and on the downstream side of the evaporator, such that the refrigerant can flow therethrough; and a supercooling control valve that controls a flow rate of the refrigerant flowing through the supercooling bypass flow path; wherein a portion of the supercooling bypass flow path, which is positioned on the downstream side of the supercooling control valve, and a portion of the refrigeration circuit, which is positioned on the downstream side of a position connected to the supercooling bypass flow path and on the upstream side of a position connected to the injection flow path, may constitute a supercooling heat exchanger in which they can exchange heat with each other.

In this case, since the refrigeration capacity of the refrigerant can be increased by the supercooling heat exchanger, the adjustment range of the refrigeration capacity can be enlarged. In addition, since the refrigerant discharged from the supercooling heat exchanger is bypassed through the injection circuit, the temperature of the refrigerant of a high temperature, which is bypassed to the downstream side of the evaporator through the hot gas circuit, can be effectively lowered.

In addition, the refrigeration device of the present invention may further comprise a control unit that controls an opening degree of the injection valve and an opening degree of the hot gas valve, wherein the control unit adjusts a flow rate of the refrigerant to flow into the evaporator by adjusting the opening degree of the injection valve and the opening degree of the hot gas valve based on a set target refrigeration capacity, thereby causing the evaporator to output the target refrigeration capacity.

In addition, the refrigeration device of the present invention may further comprise: a temperature sensor that detects a temperature of the refrigerant before it flows into the compressor from the downstream side of the evaporator; and a pressure sensor that detects a pressure of the refrigerant before it flows into the compressor from the downstream side of the evaporator; wherein the control unit adjusts the opening degree of the injection valve and the opening degree of the hot gas valve based on the temperature detected by the temperature sensor and the pressure detected by the pressure sensor, such that the refrigerant to flow into the compressor is in a gas phase and has a temperature not more than a predetermined one.

In addition, a temperature control device of the present invention comprises:

the aforementioned refrigeration device; and a brine circulation device which includes: a brine circulation path for circulating a brine; a heating unit that constitutes a part of the brine circulation path and is capable of heating the brine received therein; and a load unit that constitutes a part of the brine circulation path on the downstream side of the heating unit, and is capable of causing heat of the brine received therein to be released or is capable of causing the brine to absorb heat;

wherein a part of the brine circulation path and the evaporator of the refrigeration device constitute a heating capacity adjustment heat exchanger in which they can exchange heat with each other.

According to the temperature control device of the present invention, the temperature of the brine of the brine circulation device can be controlled by the stably adjusted refrigeration capacity outputted by the refrigeration device, so that the heating capacity or the refrigeration capacity of the load unit can be adjusted. As a result, the stable temperature control can be performed by the load unit.

According to the temperature control system of the present invention, a sufficiently wide temperature control range from a low temperature to a high temperature can be ensured, whereby a temperature of the temperature controlled space or the temperature controlled object can be easily and stably controlled to a desired temperature within the temperature control range.

According to the temperature control device of the present invention, the refrigeration capacity of the refrigeration circuit can be easily adjusted over a wide range, without operating any constituent element of the refrigeration circuit.

According to the refrigeration device of the present invention, stable temperature control can be performed.

MODE FOR CARRYING OUT THE INVENTION

An embodiment of the present invention is described herebelow.

Figure 1:
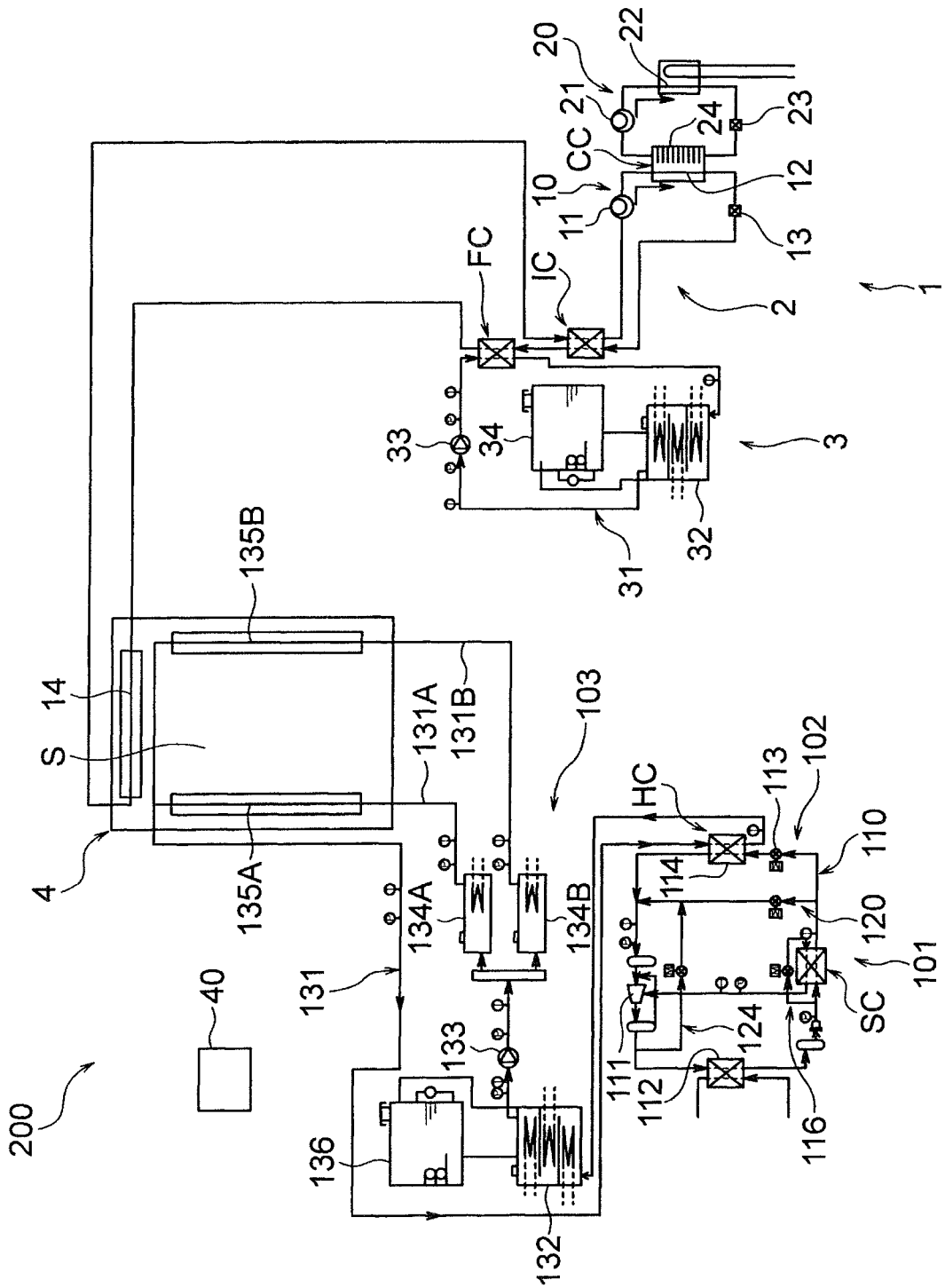
FIG. 1 is a view showing a schematic structure of a temperature control system according to an embodiment of the present invention.

FIG. 1 is a view showing a schematic structure of a temperature control system 200 according to an embodiment of the present invention. As shown in FIG. 1, the temperature control system 200 according to this embodiment includes a first temperature control device 1, a second temperature control device 101, and a chamber 4 delimiting a temperature controlled space S". The temperature control system 200 can control a temperature of the temperature controlled space S to a desired temperature within a temperature control range from a low temperature to a high temperature, by means of the first temperature control device 1 and the second temperature control device 101. The respective structures of the temperature control system 200 are described in detail below.

<First Temperature Control Device>

As shown in FIG. 1, the first temperature control device 1 in this embodiment has a low-temperature-side refrigeration device 2 and a low-temperature-side brine circulation device 3. By adjusting a refrigeration capacity of the low-temperature-side refrigeration device 2 by the low-temperature-side brine circulation device 3, the first temperature control device 1 can cool the temperature controlled space S.

The low-temperature-side refrigeration device 2 in this embodiment is a two-way refrigeration device, and includes: a first low-temperature-side refrigeration circuit 10 in which a first low-temperature-side compressor 11, a first low-temperature-side condenser 12, a first low-temperature-side expansion valve 13 and a first low-temperature-side evaporator 14 are connected such that a first low-temperature-side refrigerant is circulated therethrough in this order; and a second low-temperature-side refrigeration circuit 20 in which a second low-temperature-side compressor 21, a second low-temperature-side condenser 22, a second low-temperature-side expansion valve 23 and a second low-temperature-side evaporator 24 are connected such that a second low-temperature-side refrigerant is circulated therethrough in this order. The first low-temperature-side condenser 12 and the second low-temperature-side evaporator 24 constitute a cascade condenser CC in which they can exchange heat with each other.

In the first low-temperature-side refrigeration circuit 10, the first low-temperature-side refrigerant having been compressed by the first low-temperature-side compressor 11 flows into the first low-temperature-side condenser 12 constituting the cascade condenser CC, and is condensed by the second low-temperature-side evaporator 24 of the second low-temperature-side refrigeration circuit 20. Thereafter, the first low-temperature-side refrigerant is decompressed by the first low-temperature-side expansion valve 13 to have a lower temperature, and flows into the first low-temperature-side evaporator 14. In the illustrated example, the first low-temperature-side evaporator 14 is accommodated in the chamber 4, and the first low-temperature-side refrigerant having flown into the first low-temperature-side evaporator 14 absorbs heat of the temperature controlled space S and then flows into the first low-temperature-side compressor 11.

In this embodiment, a portion of the first low-temperature-side refrigeration circuit 10, which is positioned on the downstream side of the first low-temperature-side expansion valve 13 and on the upstream side of the first low-temperature-side evaporator 14, and a portion of the first low-temperature-side refrigeration circuit 10, which is positioned on the downstream side of the first low-temperature-side evaporator 14 and on the upstream side of the first low-temperature-side compressor 11, constitute an internal heat exchanger IC in which they can exchange heat with each other. Thus, the first low-temperature-side refrigerant, which has passed through the firs flow-temperature-side evaporator 14 to have a higher temperature, can be cooled by the first low-temperature-side refrigerant of a low temperature discharged from the first low-temperature-side expansion valve 13, before the first low-temperature-side refrigerant is sucked into the first low-temperature-side compressor 11.

In the second low-temperature-side refrigeration circuit 20, the second low-temperature-side refrigerant, which has absorbed the heat of the first low-temperature-side refrigerant in the cascade condenser CC, is compressed by the second low-temperature-side compressor 21. The compressed second low-temperature-side refrigerant flows into the second low-temperature-side condenser 22, and is condensed by cooling water flowing through the second low-temperature-side condenser 22, for example. After that, the second low-temperature-side refrigerant is decompressed by the second low-temperature-side expansion valve 23 to have a lower temperature, and flows into the second low-temperature-side evaporator 24 constituting the cascade condenser CC so as to cool the first low-temperature-side refrigerant having flown into the first low-temperature-side condenser 12.

The low-temperature-side brine circulation device 3 includes a low-temperature-side brine circulation path 31 for circulating a low-temperature-side brine, a low-temperature-side heating unit 32 that constitutes a part of the low-temperature-side brine circulation path 31 and is capable of heating the low-temperature-side brine received therein, a low-temperature-side pump 33 that constitutes a part of the low-temperature-side brine circulation path 31 and gives a driving force for circulating the low-temperature-side brine in the low-temperature-side brine circulation path 31, and a low-temperature-side brine tank 34 connected to the low-temperature-side heating unit 32.

In the illustrated example, when the low-temperature-side pump 33 drives the low-temperature-side brine so that it is circulated clockwise in the low-temperature-side brine circulation path 31, the low-temperature-side heating unit 32 can heat the low-temperature-side brine, which has been received therein as a result of the circulation of the low-temperature-side brine, at a desired heating volume. The low-temperature-side heating unit 32 includes a case part into which the low-temperature-side brine flows, and a heater installed in the case part. By adjusting a heating volume of the heater, the low-temperature-side heating unit 32 can adjust a heating capacity of the low-temperature-side brine. In this embodiment, the low-temperature-side heating unit 32 can heat the low-temperature-side brine such that a temperature of the low-temperature-side brine is higher than a temperature of the first low-temperature-side refrigerant which has been decompressed by the first low-temperature-side expansion valve 13 and has been heat-exchanged in the internal heat exchanger IC. The low-temperature-side brine is stored in the low-temperature-side brine tank 34. A gas space part is formed between a liquid level of the stored low-temperature-side brine and an upper wall of the low-temperature-side brine tank 34. The case part of the low-temperature-side heating unit 32 is fluidly connected to the gas space part in the brine tank 34 and the liquid layer part of the low-temperature-side brine.

Here, in this embodiment, a portion of the first low-temperature-side refrigeration circuit 10, which is positioned on the downstream side of the first low-temperature-side expansion valve 13 and on the upstream side of the first low-temperature-side evaporator 14, and a portion of the low-temperature-side brine circulation path 31, which is positioned on the downstream side of the low-temperature-side heating unit 32, constitute a refrigeration capacity adjustment mechanism FC in which they can exchange heat with each other. In the illustrated example, the refrigeration capacity adjustment mechanism FC is located on the downstream side of the internal heat exchanger IC in a direction along which the first low-temperature-side refrigerant flows. Namely, the internal heat exchanger IC is located on the upstream side of the refrigeration capacity adjustment mechanism FC in the direction along which the first low-temperature-side refrigerant flows. In more detail, in a portion of the first low-temperature-side refrigeration circuit 10 along which the first low-temperature-side refrigerant that has been discharged from the first low-temperature-side expansion valve 13 reaches the first low-temperature-side evaporator 14, the internal heat exchanger IC is located on the upstream side of the refrigeration capacity adjustment mechanism FC. Thus, in the portion of the first low-temperature-side refrigeration circuit 10 of the low-temperature-side refrigeration device 2, which is on the upstream side of the first low-temperature-side evaporator 14, it is possible to heat the first low-temperature-side refrigerant by means of the brine.

<Second Temperature Control Device>

As shown in FIG. 1, the second temperature control device 101 according to this embodiment includes a high-temperature-side refrigeration device 102 and a high-temperature-side brine circulation device 103. In the second temperature control device 101, the high-temperature-side brine circulation device 103 can heat or cool a temperature of the temperature controlled space S. When adjusting a heating capacity or a refrigeration capacity of the high-temperature-side brine circulation device 103, the high-temperature-side refrigeration device 102 is configured to cool the high-temperature-side brine circulating in the high-temperature-side brine circulation device 103.

Figure 2:
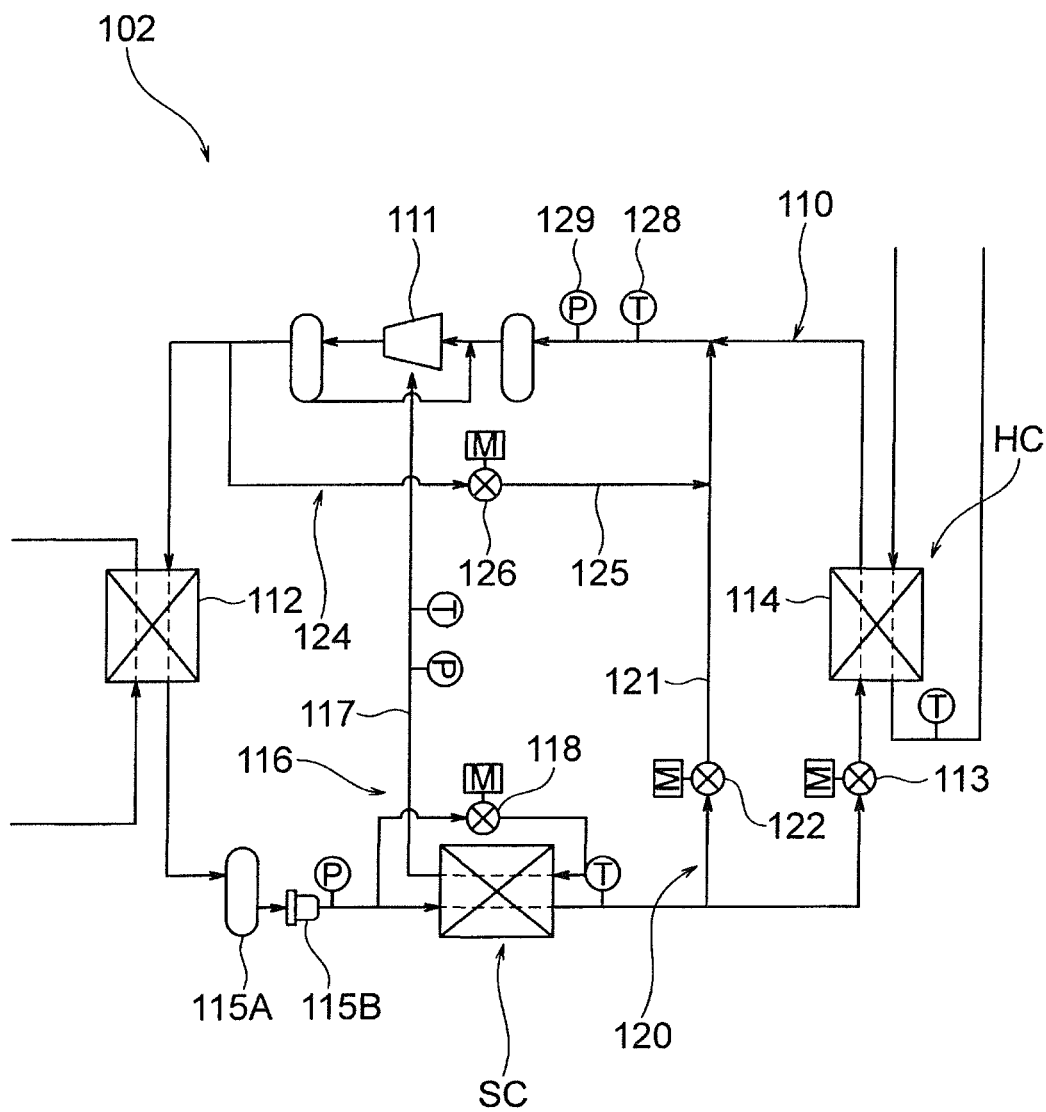
FIG. 2 is an enlarged view of a high-temperature-side refrigeration device in a second temperature control device of the temperature control system shown in FIG. 1.

The high-temperature-side refrigeration device 102 in this embodiment is a one-way refrigeration device, and includes a high-temperature-side refrigeration circuit 110 in which a high-temperature-side compressor 111, a high-temperature-side condenser 112, a high-temperature-side expansion valve 113 and a high-temperature-side evaporator 114 are connected such that a high-temperature-side refrigerant is circulated therethrough in this order, an injection circuit 120 and a hot gas circuit 124 provided for bypassing the high-temperature-side refrigerant flowing through the high-temperature-side refrigeration circuit 110, and a supercooling circuit 116 for supercooling the high-temperature-side refrigerant flowing through the high-temperature-side refrigeration circuit 110. FIG. 2 is an enlarged view of the high-temperature-side refrigeration device 102. The respective structures of the high-temperature-side refrigeration device 102 are described in detail below, with reference to FIG. 2.

In the high-temperature-side refrigeration circuit 110 shown in FIG. 2, the refrigerant basically flows as follows. The high-temperature-side refrigerant having been compressed by the high-temperature-side compressor 111 flows into the high-temperature-side condenser 112, and then the high-temperature-side refrigerant having flown into the high-temperature-side condenser 112 is condensed by cooling water, for example. Thereafter, the high-temperature-side refrigerant is decompressed by the high-temperature-side expansion valve 113 to have a lower temperature, and flows into the high-temperature-side evaporator 114. The refrigerant having flown into the high-temperature-side evaporator 14 exchanges heat, and then flows into the high-temperature-side compressor 111. The high-temperature-side refrigeration device 102 in this embodiment is configured to cool the high-temperature-side brine circulating in the high-temperature-side brine circulation device 103, by means of the high-temperature-side evaporator 114, details of which will be described later.

The injection circuit 120 includes: an injection flow path 121 that communicates (connects) a portion of the high-temperature-side refrigeration circuit 110, which is positioned on the downstream side of the high-temperature-side condenser 112 and on the upstream side of the high-temperature-side expansion valve 113, and a portion of the high-temperature-side refrigeration circuit 110, which is positioned on the downstream side of the high-temperature-side evaporator 114 and on the upstream side of the high-temperature-side compressor 111, such that the high-temperature-side refrigerant can flow therethrough; and an injection valve 122 capable of adjusting a flow rate of the refrigerant flowing through the injection flow path 121. By adjusting an opening degree of the injection valve 122, the injection circuit 120 can bypass the condensed high-temperature-side refrigerant, which flows on the downstream side of the high-temperature-side condenser 112, to the upstream side of the high-temperature-side compressor 111.

The hot gas circuit 124 includes: a hot-gas flow path 125 that communicates (connects) a portion of the high-temperature-side refrigeration circuit 110, which is positioned on the downstream side of the high-temperature-side compressor 111 and on the upstream side of the high-temperature-side condenser 112, and a portion of the injection flow path 121, which is positioned on the downstream side of the injection valve 122, such that the refrigerant can flow therethrough; and a hot gas valve 126 capable of adjusting a flow rate of the refrigerant flowing through the hot-gas flow path 125. By adjusting an opening degree of the hot gas valve 126, the hot gas circuit 124 can bypass the refrigerant having a high temperature and a high pressure, which flows on the downstream side of the high-temperature-side compressor 111, to the upstream side of the high-temperature-side compressor 111.

In addition, in this embodiment, the supercooling circuit 116 includes: a supercooling bypass flow path 117 that communicates (connects) a portion of the high-temperature-side refrigeration circuit 110, which is positioned on the downstream side of the high-temperature-side condenser 112 and on the upstream side of a position connected to the injection flow path 121, and the high-temperature-side compressor 111 in the high-temperature-side refrigeration circuit 110, such that the high-temperature-side refrigerant can flow therethrough; and a supercooling control valve 118 that controls a flow rate of the refrigerant flowing through the supercooling bypass flow path 117. In this embodiment, a portion of the supercooling bypass flow path 117, which is positioned on the downstream side of the supercooling control valve 118, and a portion of the high-temperature-side refrigeration circuit 110, which is positioned on the downstream side of a position connected to the supercooling bypass flow path 117 and on the upstream side of a position connected to the injection flow path 121, constitute a supercooling heat exchanger SC in which they can exchange heat with each other.

In the supercooling heat exchanger SC, by opening the supercooling control valve 118, the condensed high-temperature-side refrigerant flowing on the downstream side of the high-temperature-side condenser 112 can be expanded on the downstream side of the supercooling control valve 118 in the supercooling bypass flow path 117 to have a lower temperature, so that a degree of supercooling can be given to the refrigerant which flows from the high-temperature-side condenser 112 toward the high-temperature-side expansion valve 113 via the supercooling heat exchanger SC. On the other hand, the high-temperature-side refrigerant having flown through the supercooling bypass flow path 117 flows into a portion of the high-temperature-side refrigeration circuit 110, which is positioned on the upstream side of the high-temperature-side compressor 111 and on the downstream side of the high-temperature-side evaporator 114. To be specific, in this embodiment, the refrigerant having flown through the supercooling bypass flow path 117 is adapted to merge, during the compression of the high-temperature-side refrigerant by the high-temperature-side compressor 111, with the high-temperature-side refrigerant which has passed through the high-temperature-side evaporator 114 and is being compressed by the high-temperature-side compressor 111.

In the illustrated example, a receiver tank 115A and a filter dryer 115B are provided in this order on a portion of the high-temperature-side refrigeration circuit 110, which is positioned on the downstream side of the high-temperature-side condenser 112 and on the upstream side of a position connected to the supercooling bypass flow path 117.

Returning to FIG. 1, the high-temperature-side brine circulation device 103 includes: an annular high-temperature-side brine circulation path 131 for circulating the high-temperature-side brine; a high-temperature-side main heating unit 132 that constitutes a part of the high-temperature-side brine circulation path 131 and is capable of heating the high-temperature-side brine received therein; a high-temperature-side pump 133 that constitutes a part of the high-temperature-side brine circulation path 131 and gives a driving force for circulating the brine in the high-temperature-side brine circulation path 131; a first high-temperature-side sub heating unit 134A and a second high-temperature-side sub heating unit 134B that are located on the downstream side of the high-temperature-side pump 133 to constitute a part of the high-temperature-side brine circulation path 131 and are capable of heating the high-temperature-side brine received therein; a first load unit 135A that is located on the downstream side of the first high-temperature-side sub heating unit 134A to constitute a part of the high-temperature-side brine circulation path 131; a second load unit 135B that is located on the downstream side of the second high-temperature-side sub heating unit 134B to constitute a part of the high-temperature-side brine circulation path 131; and a high-temperature-side brine tank 136 connected to the high-temperature-side main heating unit 132. The high-temperature-side brine is a substance capable of releasing or absorbing heat in the load units 135A and 135B, without changing its phase or to a degree at which it does not change the phase. A type of the high-temperature-side brine is selected depending on a desired temperature control range. The high-temperature-side brine may be ethylene glycol solution, calcium chloride solution or water, for example.

In this embodiment, a portion of the high-temperature-side brine circulation path 131 on the downstream side of the high-temperature-side pump 133 is branched to a first branch part 131A and a second branch part 131B. The first high-temperature-side sub heating unit 134A and the first load unit 135A respectively constitute a part of the first branch part 131A, and the second high-temperature-side heating unit 134B and the second load unit 135B respectively constitute a part of the second branch part 131B. The first branch part 131A and the second branch part 131B merge with each other on the downstream side of the first load unit 135A and the second load unit 135B. The brine, which has passed through the position at which the first branch part 131A and the second branch part 131B are merged, passes through a below-described heating capacity adjustment heat exchanger HC, and then flows toward the high-temperature-side main heating unit 132. After the brine has passed through the high-temperature-side main heating unit 132, the brine again flows into the first branch part 131A and the second branch part 131B.

When the high-temperature-side brine is driven by the high-temperature-side pump 133 to circulate in the high-temperature-side brine circulation path 131, the respective high-temperature-side main heating unit 132, the first high-temperature-side sub heating unit 134A and the second high-temperature-side sub heating unit 134B can heat the high-temperature-side brine, which has been received therein as a result of the circulation of the high-temperature-side brine, at a desired heating volume. Each heating unit 132, 134A, 134B has a case part into which the high-temperature-side brine flows, and a heater installed in the case part. By adjusting a heating volume of the heater, each heating unit can adjust a heating capacity of the high-temperature-side brine. In the illustrated example, the high-temperature-side main heating unit 132 is equipped with a plurality of heaters, and each of the first high-temperature-side sub heating unit 134A and the second high-temperature-side sub heating unit 134B is equipped with one heater. However, the number of heater(s) is not particularly limited, and can be determined depending on a maximum control temperature set for the temperature controlled space S.

As shown in FIG. 1, in this embodiment, the first load unit 135A and the second load unit 135B are installed in the chamber 4, and can cause the brine to release its heat to the temperature controlled space S or cause the brine to absorb the heat of the temperature controlled space S. Namely, when the temperature controlled space S is heated, the second temperature control device 101 causes the first load unit 135A and the second load unit 135B to release their heat to the temperature controlled space S. On the other hand, when the temperature controlled space S is cooled, the second temperature control device 101 causes the first load unit 135A and the second load unit 135B to absorb the heat of the temperature controlled space S.

The brine is stored in the high-temperature-side brine tank 136. A gas space part is formed between the liquid level of the stored brine and an upper wall of the high-temperature-side brine tank 136. The case part of the high-temperature-side main heating unit 132 is fluidly connected to the gas space part of the high-temperature-side brine tank 136 and the liquid layer part of the high-temperature-side brine.

In this embodiment, as shown in FIG. 1, a part of the high-temperature-side brine circulation path 131 and the high-temperature-side evaporator 114 of the high-temperature-side refrigeration device constitute the heating capacity adjustment heat exchanger HC in which they can exchange heat with each other. In more detail, in this embodiment, a portion of the high-temperature-side brine circulation path 131, which is positioned on the downstream side of the first load unit 135A and the second load unit 135B and on the upstream side of the high-temperature-side main heating unit 132, and the high-temperature-side evaporator 114 constitute the heating capacity adjustment heat exchanger HC. Thus, the high-temperature-side brine in the high-temperature-side brine circulation device 103 can be cooled by means of the high-temperature-side refrigeration device 102. In this embodiment, since the high-temperature-side brine cooled by the high-temperature-side refrigeration device 102 is heated by the high-temperature-side main heating unit 132, the first high-temperature-side sub heating unit 134A and the second high-temperature-side sub heating unit 134B, or passes therethrough without being heated, the temperature of the temperature controlled space S can be controlled at a desired heating capacity or a refrigeration capacity.

<Control Unit>

Next, a control unit 40 that controls respective units of the temperature control system 200 is described. FIG. 1 shows the control unit 40, and a plurality of temperature sensors and pressure sensors disposed on the first temperature control device 1 and the second temperature control device 101. In this embodiment, the control unit 40 is configured to control the respective units of the first temperature control device 1 (low-temperature-side pump 33, first low-temperature-side compressor 11, second low-temperature-side compressor 21, low-temperature-side heating unit 32, etc.) and the respective units of the second temperature control device 101 (high-temperature-side pump 133, high-temperature-side compressor 111, injection valve 122, hot gas valve 126, heating units 132, 134A and 134B, etc.), based on detection of the temperature sensors and the pressure sensors.

For example, the control unit 40 in this embodiment can switch ON and OFF of the low-temperature-side pump 33, the first low-temperature-side compressor 11 and the second low-temperature-side compressor 21, and can switch ON and OFF of the high-temperature-side pump 133 and the high-temperature-side compressor 111. In addition, the control unit 40 is adapted to adjust an opening degree of the injection valve 122 and an opening degree of the hot gas valve 126 based on a set target refrigeration capacity so as to adjust a flow rate of the high-temperature-side refrigerant to flow into the high-temperature-side evaporator 114, in order that the high-temperature-side evaporator 114 can be caused to output the target refrigeration capacity. The target refrigeration capacity may be calculated depending on a target temperature or the like that is set by a user for the temperature controlled space S.

In FIG. 2, the reference numeral 128 depicts a temperature sensor that detects a temperature of the high-temperature-side refrigerant which flows from the downstream side of the high-temperature-side evaporator 114 and is about to flow into the high-temperature-side compressor 111, and the reference numeral 129 depicts a pressure sensor that detects a pressure of the high-temperature-side refrigerant which flows from the downstream side of the high-temperature-side evaporator 114 and is about to flow into the high-temperature-side compressor 111. In the illustrated example, the high-temperature-side temperature sensor 128 and the high-temperature-side pressure sensor 129 are located on the downstream side of the positions of the injection circuit 120 and the hot gas circuit 124 connected to the high-temperature-side refrigeration circuit 110. In this embodiment, as described above, when the refrigeration capacity of the high-temperature-side refrigeration device 102 is adjusted, the control unit 40 adjusts the opening degree of the injection valve 122 and the opening degree of the hot gas valve 126 based on a temperature detected by the temperature sensor 128 and a pressure detected by the pressure sensor 129, in such a manner that the high-temperature-side refrigerant to flow into the high-temperature-side compressor 111 is in a gas phase and has a temperature not more than a predetermined temperature. The predetermined temperature is, for example, about a temperature at which the high-temperature-side 111 is not burned out.

<Operation>

Next, an operation of the temperature control system 200 according to this embodiment is described with reference to FIGS. 3 to 6. The temperature control system 200 is configured to adjust a temperature of the temperature controlled space S to a desired temperature in a low temperature range, a middle temperature range or a high temperature range, by means of control of the control unit 40 which switches operation conditions of the first temperature control device 1 and the second temperature control device 101. In this embodiment, for example, the low temperature range is a range from −60° C. to −20° C., the middle temperature range is a rang from −19° C. to +25° C., and the high temperature range is a range from +26° C. to +120° C. However, such ranges are not particularly limited.

Figure 3:
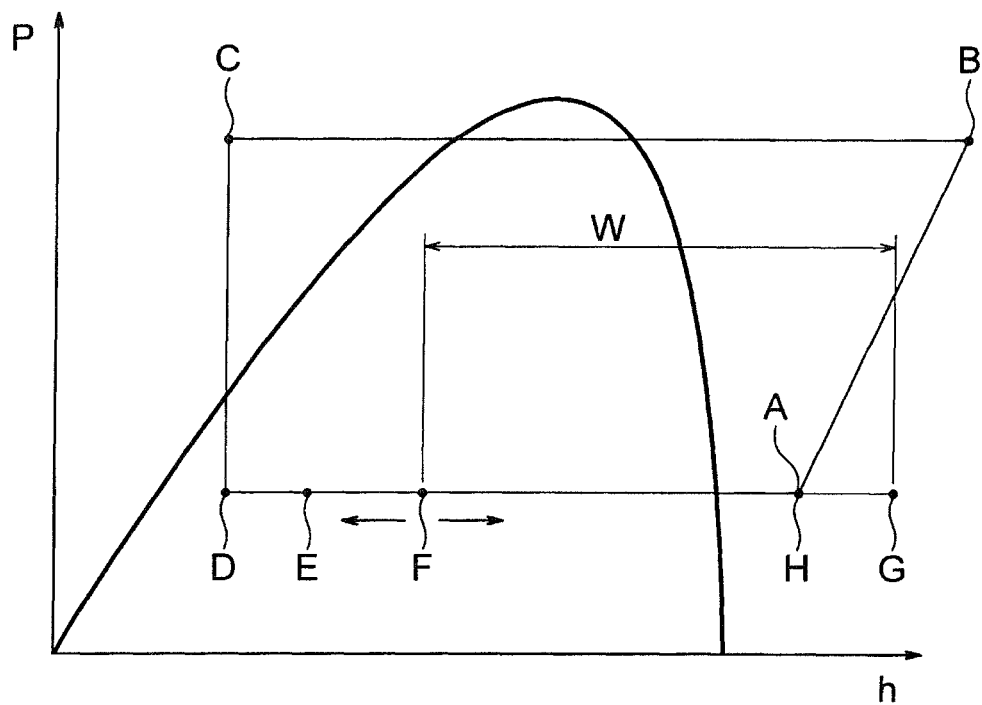
FIG. 3 is a view showing an example of a Mollier diagram of a low-temperature-side refrigeration circuit in a first temperature control device of the temperature control system shown in FIG. 1.
Figure 4:
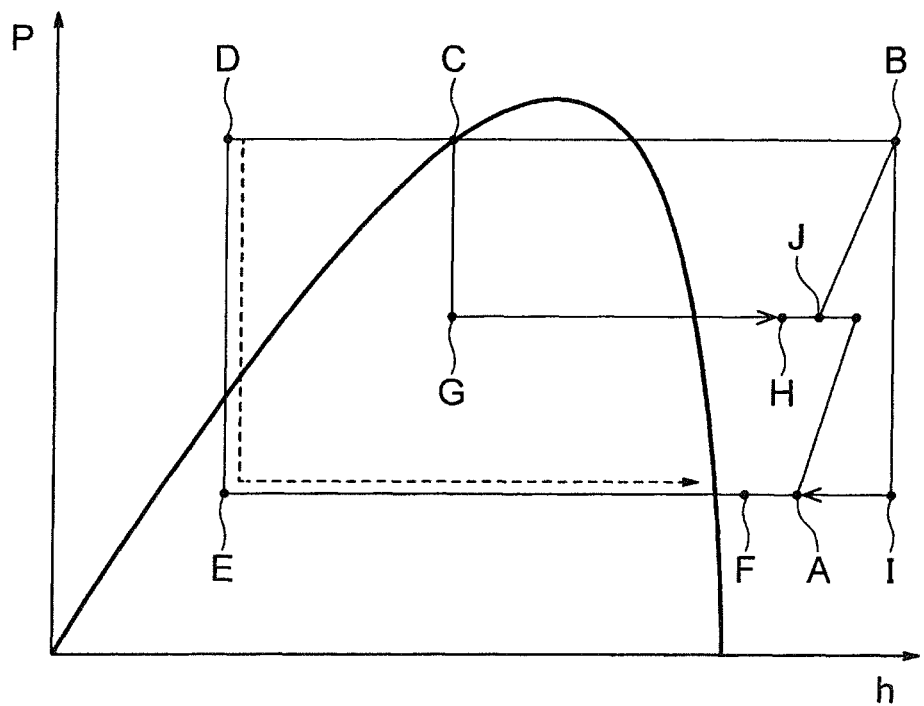
FIG. 4 is a view showing an example of a Mollier diagram of a high-temperature-side refrigeration device in the second temperature control device of the temperature control system shown in FIG. 1.
Figure 5:
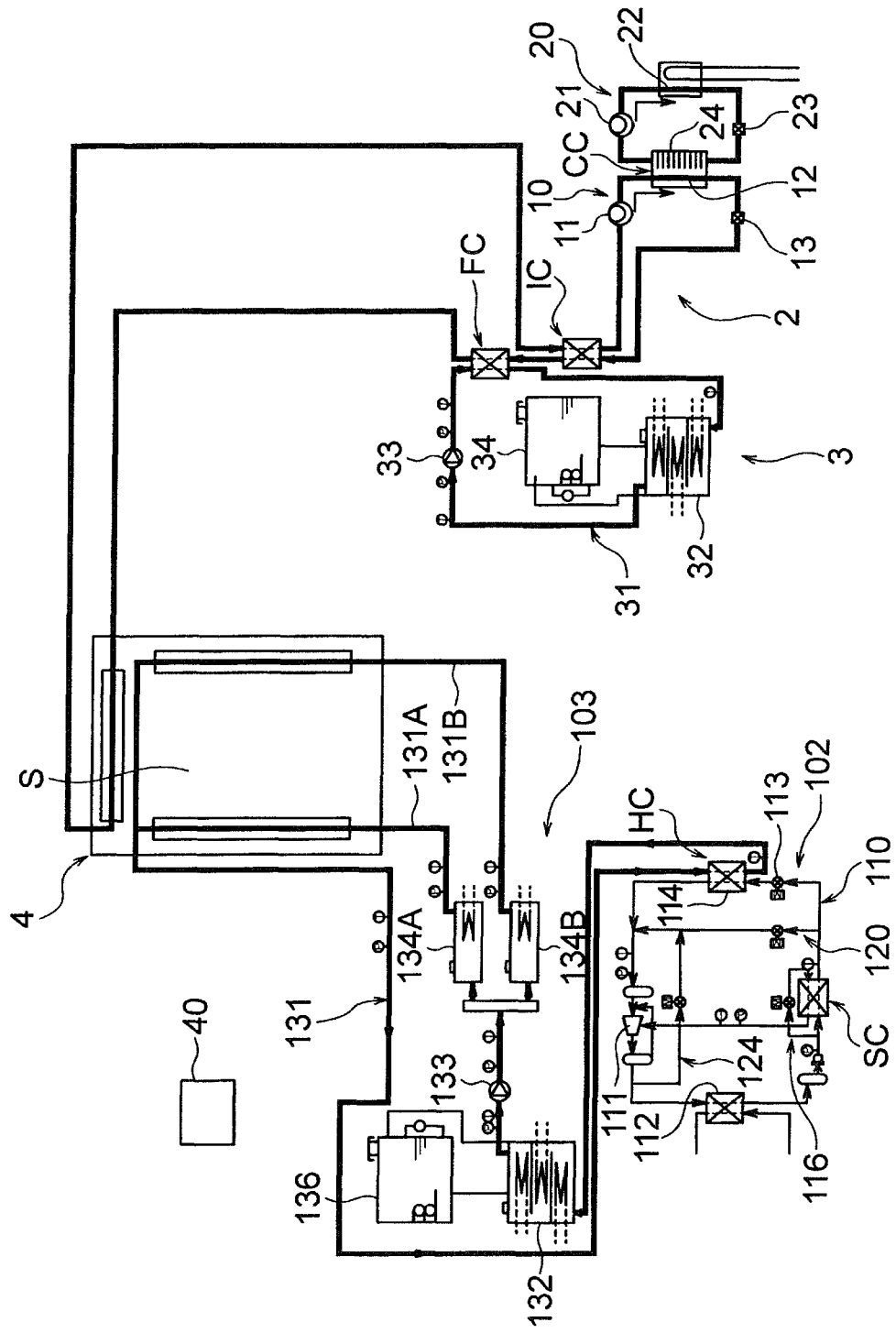
FIG. 5 is a view showing a state when a temperature control of a low temperature range is performed in the temperature control system shown in FIG. 1.
Figure 6:
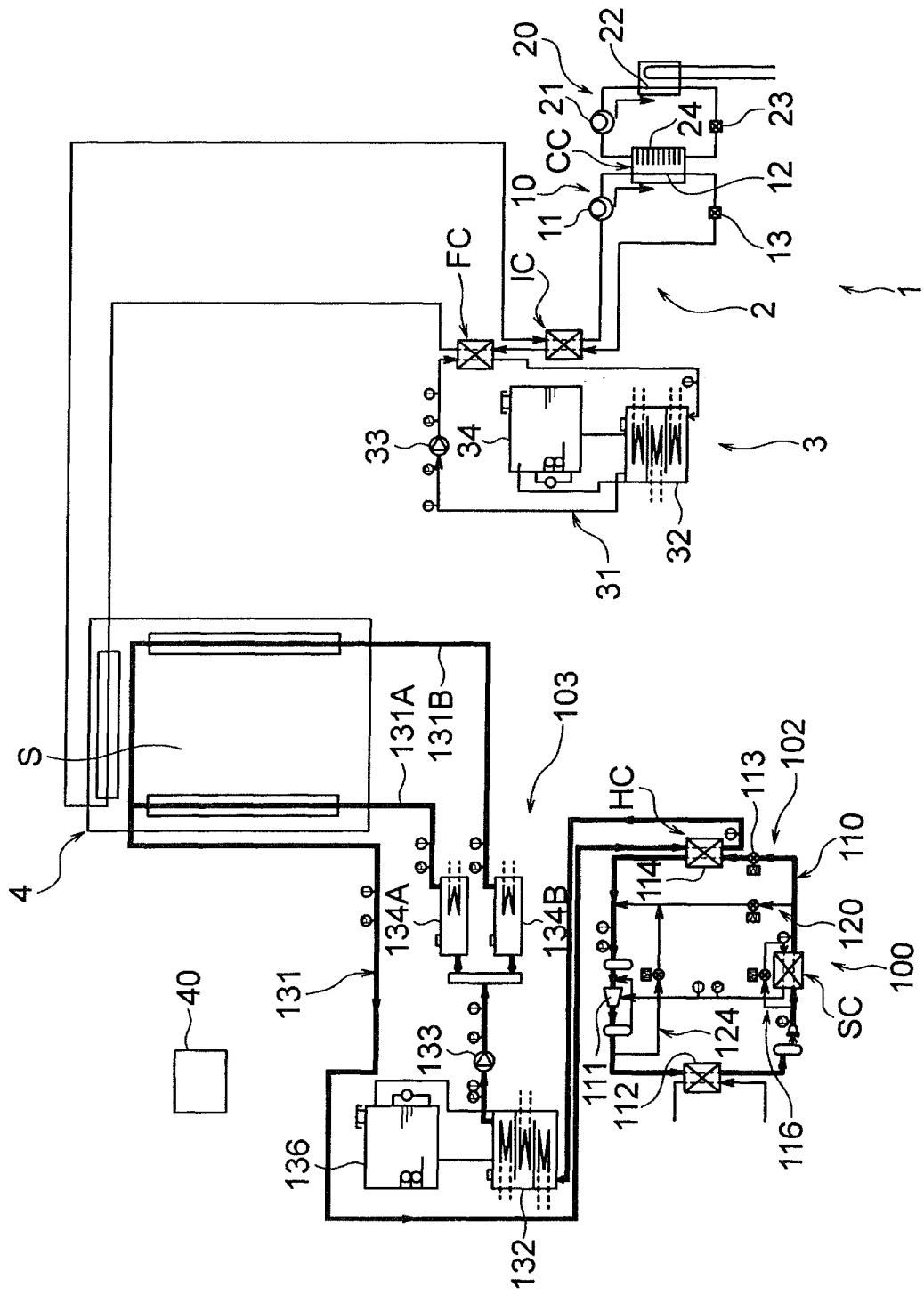
FIG. 6 is a view showing a state when a temperature control of a middle temperature range or a high temperature range is performed in the temperature control system shown in FIG. 1.

FIG. 3 is a view showing an example of a Mollier diagram of the first low-temperature-side refrigeration circuit 10 in the first temperature control device 1, and FIG. 4 is a view showing an example of a Mollier diagram of the high-temperature-side refrigeration device 102 in the second temperature control device 101. FIG. 5 is a view showing a state when a temperature control of a low temperature range is performed, and FIG. 6 is a view showing a state when a temperature control of a middle temperature range or a high temperature range is performed. Herebelow, control ways of the low temperature range, the middle temperature range and the high temperature range are described in this order.

(Temperature Control of Low Temperature Range)

When a temperature control of the low temperature range is performed, in the first temperature control device 1, the first low-temperature-side compressor 11, the second low-temperature-side compressor 21 and the low-temperature-side pump 33 are driven. On the other hand, in the second temperature control device 101, the high-temperature-side pump 133 of the high-temperature-side brine circulation device 103 is driven, while the high-temperature-side refrigeration device 102 is stopped, so that the high-temperature-side refrigerant is not circulated. In FIG. 5, the bold lines depicted on the pipes represent lines in which the refrigerant or the brine is circulated, showing an operation condition upon temperature control of the low temperature range.

At this time, in the first low-temperature-side refrigeration circuit 10, the first low-temperature-side refrigerant having been compressed by the first low-temperature-side compressor 11 flows into the first low-temperature-side condenser 12 constituting the cascade condenser CC, so as to be condensed by the second low-temperature-side evaporator 24 of the second low-temperature-side refrigeration circuit 20. Thereafter, the first low-temperature-side refrigerant is decompressed by the first low-temperature-side expansion valve 13 to have a lower temperature, and flows into the first low-temperature-side evaporator 14. Then, the first low-temperature-side refrigerant having flown into the first low-temperature-side evaporator 14 absorbs the heat of the temperature controlled space S, and flows into the first low-temperature-side compressor 11.

In this embodiment, due to the provision of the internal heat exchanger IC, before the first low-temperature-side refrigerant, which has passed through the first low-temperature-side evaporator 14 to have a higher temperature, is sucked into the first low-temperature-side compressor 11, the first low-temperature-side refrigerant is cooled by the first refrigerant of a low temperature discharged by the first low-temperature-side expansion valve 13. Thus, it can be prevented that the first low-temperature-side refrigerant having an excessive degree of superheat is sucked into the first low-temperature-side compressor 11.

On the other hand, in the second low-temperature-side refrigeration circuit 20, the second low-temperature-side refrigerant, which has absorbed the heat of the first low-temperature-side refrigerant in the cascade condenser CC, is compressed by the second low-temperature-side compressor 21. The compressed second low-temperature-side refrigerant flows into the second low-temperature-side condenser 22, and is condensed by the cooling water flowing in the second low-temperature-side condenser 22. Thereafter, the second low-temperature-side refrigerant is decomposed by the second low-temperature-side expansion valve 23 to have a lower temperature, and flows into the second low-temperature-side evaporator 24 constituting the cascade condenser CC. Then, the second low-temperature-side refrigerant again cools the first refrigerant having flown into first low-temperature-side condenser 12. In this embodiment, the first low-temperature-side compressor 11 and the second low-temperature-side compressor 21 are operated at a constant output in order for control stability.

In the low-temperature-side brine circulation device 3, the low-temperature-side brine is circulated in the low-temperature-side brine circulation path 31 so that the low-temperature-side brine can be suitably heated by the low-temperature-side heating unit 32.

In this embodiment, due to the provision of the refrigeration capacity adjustment mechanism FC, the first low-temperature-side refrigerant can be heated by the brine heated by the low-temperature-side heating unit 32, at a portion of the first low-temperature-side refrigeration circuit 10 of the low-temperature-side refrigeration device 2, which is on the upstream side of the first low-temperature-side evaporator 14. At this time, the refrigeration capacity of the first low-temperature-side evaporator 14 can be adjusted depending on the heating capacity of the brine.

On the other hand, in the high-temperature-side brine circulation device 103, the high-temperature-side brine is circulated in the high-temperature-side brine circulation path 131, so that the high-temperature-side brine can be suitably heated by the high-temperature-side main heating unit 132 and so on. In the temperature control of the low temperature range is performed by the first temperature control device 1, since the high-temperature-side brine is circulated, when the temperature control of the low temperature range is switched to a temperature control of the middle temperature range or the high temperature range, a time required for a temperature in the low temperature range to reach a desired temperature in the middle temperature range or the high temperature range can be effectively reduced. When the temperature control of the low temperature range is performed, the high-temperature-side brine is not heated.

In view of FIG. 3, the refrigeration capacity adjustment performed by the first temperature control device 1 is described in detail. As shown in FIG. 3, in a refrigeration cycle in the first temperature control device 1, the first low-temperature-side refrigerant, which has been sucked into the first low-temperature-side compressor 11, is compressed, as shown by the transition from the point A to the point B. The first low-temperature-side refrigerant discharged by the first low-temperature-side compressor 11 is condensed by the first low-temperature-side condenser 12 so as to be cooled, whereby its specific enthalpy decreases, as shown by the transition from the point B to the point C.

Then, as shown by the transition from the point C to the point D, the first low-temperature-side refrigerant, which has been condensed by the first low-temperature-side condenser 12, is decompressed by the first low-temperature-side expansion valve 13 to have a lower temperature. Thereafter, the first low-temperature-side refrigerant discharged from the first low-temperature-side expansion valve 13 exchanges heat in the internal heat exchanger IC with the first lowtemperature-side refrigerant immediately before it flows into the first low-temperature-side compressor 11. Thus, as shown by the transition from the point D to the point E, the first low-temperature-side refrigerant discharged from the first low-temperature-side expansion valve 13 absorbs the heat, whereby its specific enthalpy increases. After that, the first low-temperature-side refrigerant exchanges heat with the heated low-temperature-side brine in the refrigeration capacity adjustment mechanism FC. Thus, as shown by the transition from the point E to the point F, the first low-temperature-side refrigerant absorbs the heat, whereby its specific enthalpy increases.

After that, the first low-temperature-side refrigerant flows into the first low-temperature-side evaporator 14 to absorb the heat of the temperature controlled space S. Thus, as shown by the transition from the point F to the point G, its specific enthalpy increases. Then, the first low-temperature-side refrigerant having passed through the first low-temperature-side evaporator 14 exchanges heat in the internal heat exchanger IC with the first low-temperature-side refrigerant of a low temperature discharged from the first low-temperature-side expansion valve 13, so as to be cooled. Thus, as shown by the transition from the point G to the point H, its specific enthalpy decreases. Thus, it can be prevented that the first low-temperature-side refrigerant having an excessive degree of superheat is sucked into the first low-temperature-side compressor 11. After that, the first low-temperature-side refrigerant flows into the first low-temperature-side compressor 11 so as to be compressed.

In the aforementioned Mollier diagram, the position of the point F can be varied depending on the heating capacity of the heated low-temperature-side brine. The refrigeration capacity of the first low-temperature-side refrigeration circuit 10 is in proportion to a difference, which is indicated by the reference numeral W, between the specific enthalpy of the first low-temperature-side refrigerant immediately before it flows into the first low-temperature-side evaporator 14, and the specific enthalpy of the first low-temperature-side refrigerant immediately after it has flown out from the first low-temperature-side evaporator 14. Thus, in this embodiment, by adjusting the heating capacity of the heated low-temperature-side brine, the refrigeration capacity of the first low-temperature-side refrigeration circuit 10 can be adjusted.

(Temperature Control of Middle Temperature Range)

When a temperature control of the middle temperature range is performed, in the first temperature control device 1, the first low-temperature-side compressor 11, the second low-temperature-side compressor 21 and the low-temperature-side pump 33 are not driven. On the other hand, in the second temperature control device 101, the high-temperature-side pump 133 of the high-temperature-side brine circulation device 103 is driven, and the high-temperature-side high-temperature-side compressor 111 of the high-temperature-side refrigeration device 102 is driven. In FIG. 6, the bold lines depicted on the pipes represent lines in which the refrigerant or the brine is circulated, showing an operation condition upon temperature control of the middle temperature range.

At this time, in the high-temperature-side refrigeration circuit 110 of the high-temperature-side refrigeration device 102, the high-temperature-side refrigerant, which has been compressed by the high-temperature-side compressor 111, flows into the high-temperature-side condenser 112 so as to be condensed. Thereafter, the high-temperature-side refrigerant passes through the supercooling heat exchanger SC. At this time, when the supercooling control valve 118 is opened, the condensed high-temperature-side refrigerant, which flows on the downstream side of the high-temperature-side condenser 112, is expanded in the supercooling bypass flow path 117 on the downstream side of the supercooling control valve 118 to have a lower temperature, whereby a degree of supercooling can be given to the high-temperature-side refrigerant which flows from the high-temperature-side condenser 112 toward the high-temperature-side expansion valve 113 via the supercooling heat exchanger SC. The refrigerant having been expanded by the supercooling control valve 118 flows into the high-temperature-side compressor 111, with the heat absorbed therein.

After that, the high-temperature-side refrigerant passing through the high-temperature-side expansion valve 113 is decompressed to have a lower temperature, and flows into the high-temperature-side evaporator 114. The refrigerant having flown into the high-temperature-side evaporator 114 can exchange heat in the heating capacity adjustment heat exchanger HC with the high-temperature-side brine. When the high-temperature-side brine has a temperature higher than that of the high-temperature-side refrigerant, the refrigerant absorbs the heat and flows into the high-temperature-side compressor 111.

In this embodiment, due to the provision of the injection circuit 120 and the hot gas circuit 124, the high-temperature-side refrigerant, which has been condensed by the high-temperature-side condenser 112, can be caused to pass through the injection circuit 120 in order not to flow into the high-temperature-side evaporator 114, so as to be bypassed to the downstream side of the high-temperature-side evaporator 114, as well as the high-temperature-side refrigerant of a high temperature discharged by the high-temperature-side compressor 111 can be caused to pass through the hot gas circuit 124 so as to be bypassed to the downstream side of the high-temperature-side evaporator 114. Thus, the flow rate of the high-temperature-side refrigerant to flow into the high-temperature-side evaporator 114 can be controlled, whereby the refrigeration capacity to be outputted by the high-temperature-side evaporator 114 can be flexibly adjusted.

At this time, in this embodiment, the control unit 40 adjusts the opening degree of the injection valve 122 and the opening degree of the hot gas valve 126 based on the set target refrigeration capacity, in such a manner that the flow rate of the refrigerant to flow into the high-temperature-side evaporator 114 is adjusted so as to cause the high-temperature-side evaporator 114 to output the target refrigeration capacity. At this time, the control unit 40 adjusts the opening degree of the injection valve 122 and the opening degree of the hot gas valve 126 based on a temperature detected by the temperature sensor 128 and a pressure detected by the pressure sensor 129, in such a manner that the refrigerant to flow into the high-temperature-side compressor 111 is in a gas phase and has a temperature not more than a predetermined one.

In order to obtain the aforementioned target refrigeration capacity, the flow rate of the high-temperature-side refrigerant flowing through the high-temperature-side evaporator 114 is adjusted. Thus, in order to achieve this, the amount of the high-temperature-side refrigerant to be bypassed to the injection circuit 120 and the amount of the high-temperature-side refrigerant to be bypassed to the hot gas circuit 124 can be optionally determined. Thus, it can be easily done that the refrigerant to flow into the high-temperature-side compressor 111 is in a gas phase and has a temperature not more than a predetermined one. In addition, in this embodiment, since the high-temperature-side refrigerant from the hot gas circuit 124 flows into the injection flow path 121 before it reaches the high-temperature-side refrigeration circuit 110, it can be prevented that the high-temperature-side refrigerant has an excessively high temperature in the high-temperature-side refrigeration circuit 110 and the high-temperature-side compressor 111, whereby the burnout of the high-temperature-side compressor 111 and the like can be prevented.

FIG. 4 shows a Mollier diagram of the high-temperature-side temperature control device 102 in the second temperature control device 101 when the injection circuit 120 and the hot gas circuit 124 are operated and the supercooling circuit 116 is operated so as to cool the high-temperature-side brine. As shown in FIG. 4, in a refrigeration cycle in the second temperature control device 101, the high-temperature-side refrigerant, which has sucked into the high-temperature-side compressor 111, is compressed, as shown by the transition from the point A to the point B. The refrigerant having been discharged by the high-temperature-side compressor 111 is condensed by the high-temperature-side condenser 112 so as to be cooled. Thus, as shown by the transition from the point B to the point C, its specific enthalpy decreases.

Then, a degree of supercooling is given to a part of the high-temperature-side refrigerant having been condensed by the high-temperature-side condenser 112 in the supercooling heat exchanger SC. Thus, as shown by the transition from the point C to the point D, its specific enthalpy decreases. On the other hand, the refrigerant flowing through the supercooling bypass flow path 117 for giving a degree of supercooling is expanded by the supercooling control valve 118 in the supercooling heat exchanger SC. Thus, as shown by the transition from the point C to the point G, the refrigerant is decompressed down to about a middle pressure, for example, and exchanges heat in the supercooling heat exchanger SC so as to absorb the heat. Thus, as shown by the transition from the point G to the point H, its specific enthalpy increases.

Then, the refrigerant to which the degree of supercooling has been given in the supercooling heat exchanger SC is decompressed by the high-temperature-side expansion valve 113 to have a lower temperature, as shown by the transition from the point D to the point E. Thereafter, the high-temperature-side refrigerant having been discharged from the high-temperature-side expansion valve 113 exchanges heat with the high-temperature-side brine in the high-temperature-side evaporator 114, i.e., the heating capacity adjustment heat exchanger HC, so as to absorb the heat. Thus, as shown by the transition from the point E to the point F, its specific enthalpy increases. Since the control unit 40 controls the respective valves of the injection circuit 120 and the hot gas circuit 124 so as to generate a high-temperature-side refrigerant that does not pass through the evaporator 114, a flow rate of the refrigerant passing through the high-temperature-side evaporator 114 can be controlled so that its refrigeration capacity is adjusted.

In FIG. 4, as shown from the point B to the point I, the high-temperature-side refrigerant, which is bypassed to the upstream side of the high-temperature-side compressor 111 through the hot gas circuit 124, is decompressed by the hot gas valve 126. In addition, as shown by the dotted lines extending from the point D, the high-temperature-side refrigerant, which is bypassed to the upstream side of the high-temperature-side compressor 111 through the injection circuit 120, is decompressed by the injection valve 122. Then, on the upstream side of the high-temperature-side compressor 111, the high-temperature-side refrigerant having passed through the high-temperature-side evaporator 114 so as to be in the condition of the point F, the high-temperature-side refrigerant bypassed through the hot gas circuit 124, and the high-temperature-side refrigerant bypassed through the injection circuit 120 merge with one another (point A). Here, since the control unit 40 can adjust the position of the point A by adjusting a ratio between the high-temperature-side refrigerant to be bypassed through the hot gas circuit 124 and the high-temperature-side refrigerant to be bypassed through the injection circuit 120, it is easily possible that the high-temperature-side refrigerant to flow into the high-temperature-side compressor 111 is in a gas phase and has a temperature not more than a predetermined one. Thereafter, the high-temperature-side refrigerant is compressed by the high-temperature-side compressor 111 to move from the point A to the high pressure side. In the course of this, the high-temperature-side refrigerant is mixed with the high-temperature-side refrigerant from the supercooling bypass flow path 117 to reach the point J, and is thereafter compressed to the point B.

On the other hand, in the high-temperature-side brine circulation device 103, the high-temperature-side brine is circulated in the high-temperature-side brine circulation path 131, so that the high-temperature-side brine can be suitably heated by the high-temperature-side main heating unit 132, the first high-temperature-side sub heating unit 134A and the second high-temperature-side sub heating unit 134B. In this embodiment, the portion of the high-temperature-side brine circulation path 131, which is positioned on the downstream side of the first load unit 135A and the second load unit 135B and on the upstream side of the high-temperature-side main heating unit 132, and the high-temperature-side evaporator 114 constitute the heating capacity adjustment heat exchanger HC. Thus, the high-temperature-side brine in the high-temperature-side brine circulation device 103 can be cooled by the high-temperature-side refrigeration device 102. In this embodiment, since the high-temperature-side brine cooled by the high-temperature-side refrigeration device 102 is heated by the high-temperature-side main heating unit 132, the first high-temperature-side sub heating unit 134A and the second high-temperature-side sub heating unit 134B, or passes therethrough without being heated, the temperature of the temperature controlled space S can be controlled at a desired heating capacity or a refrigeration capacity.

(Temperature Control of High Temperature Range)

When a temperature control of the high temperature range is performed, similarly to the middle temperature range, in the first temperature control device 1, the first low-temperature-side compressor 11, the second low-temperature-side compressor 21 and the low-temperature-side pump 33 are not driven. On the other hand, in the second temperature control device 101, the high-temperature-side pump 133 of the high-temperature-side brine circulation device 103 is driven, and the high-temperature-side compressor 111 of the high-temperature-side refrigeration device 102 is driven. However, a flow rate of the high-temperature-side brine to be circulated in the high-temperature-side brine 103 is increased as compared with the flow rate in the case of the middle temperature range. When the temperature control of the high temperature range is performed, the flow rate of the high-temperature-side brine to be circulated may be about 1.5 to 3 times larger than the flow rate in the case of the middle temperature range, for example.

As described above, according to the temperature control system 200 according to this embodiment, in the first temperature control device 1, the first low-temperature-side refrigerant can be heated by the low-temperature-side brine at the portion of the first low-temperature-side refrigeration circuit 10 of the low-temperature-side refrigeration device 2 on the upstream side of the first low-temperature-side evaporator 14. At this time, the refrigeration capacity of the first low-temperature-side evaporator 14 can be adjusted depending on the heating capacity of the low-temperature-side brine. Thus, the refrigeration capacity of the first low-temperature-side refrigeration circuit 10 can be easily adjusted over a wide range, without operating any constituent element of the refrigeration circuit 10. In addition, in the second temperature control device 101, the high-temperature-side refrigerant condensed by the high-temperature-side condenser 112 can be bypassed to the downstream side of the high-temperature-side evaporator 114 thorough the injection circuit 120, in order that the high-temperature-side refrigerant does not flow into the high-temperature-side evaporator 114, as well as the high-temperature-side refrigerant of a high temperature discharged by the high-temperature-side compressor 111 can be bypassed to the downstream side of the high-temperature-side evaporator 114 through the hot gas circuit 124. Thus, the flow rate of the high-temperature-side refrigerant to flow into the high-temperature-side evaporator 114 can be controlled, whereby the refrigeration capacity outputted by the high-temperature-side evaporator 114 can be flexibly adjusted. At this time, since there is no possibility that the high-temperature-side refrigerant to flow into the high-temperature-side evaporator 114 is mixed with the high-temperature-side refrigerant of a high pressure, the refrigeration capacity to be outputted can be made stable. In addition, by adjusting a ratio between the condensed high-temperature-side refrigerant to be bypassed through the injection circuit 120 and the high-temperature-side refrigerant of a high temperature to be bypassed through the hot gas circuit 124, the condition and the temperature of the high-temperature-side refrigerant to flow into the high-temperature-side compressor 111 can be easily controlled into a desired condition. Thus, the temperature control can be stably performed, while flexibly adjusting the refrigeration capacity. Accordingly, the temperature of the high-temperature-side brine of the high-temperature-side brine circulation device 103 can be controlled by the stably adjusted refrigeration capacity outputted by the high-temperature-side refrigeration device 102, so that the heating capacity or the refrigeration capacity of the load units 135A and 135B can be adjusted. As a result, the stable temperature control can be performed by the load units 135A and 135B. Then, by differentiating the temperature control range of the first temperature control device 1 from that of the second temperature control device 101 have different temperature control ranges, a sufficiently wide temperature control range from a low temperature to a high temperature can be ensured.

Thus, a sufficiently wide temperature control range from a low temperature to a high temperature can be ensured, whereby a temperature of the temperature controlled space or the temperature controlled object can be easily and stably controlled to a desired temperature within the temperature control range.

In addition, in this embodiment, when a temperature control of the low temperature range, in which a temperature is controlled to a desired temperature in the low temperature range by circulating the first low-temperature-side refrigerant in the low-temperature-side refrigerant device 2 and by circulating low-temperature-side brine in the low-temperature-side brine circulation device 3 is carried out, by circulating the high-temperature-side brine in the high-temperature-side brine circulation device, thereby, in the case that the temperature control of the low temperature range is switched to a temperature control of the middle temperature range or the high temperature range, the temperature control by means of the high-temperature-side brine can be rapidly performed. Thus, a time required for reaching a desired temperature in the middle temperature range or the high temperature range from the low temperature range can be effectively reduced. In addition, when the temperature control is switched from the middle temperature range to the high temperature range, a flow rate of the high-temperature-side brine to be circulated in the high-temperature-side brine circulation device 103 is increased as compared with the flow rate in the case of the middle temperature range. Thus, a time required for reaching a desired temperature in the high temperature range from the middle temperature range can be effectively reduced.

In addition, in this embodiment, since the first low-temperature-side refrigerant, which has passed through the first low-temperature-side evaporator 14 to have a higher temperature, is cooled by the first low-temperature-side refrigerant of a low temperature discharged by the first low-temperature-side expansion valve 13, before the first low-temperature-side refrigerant is sucked into the first low-temperature-side compressor 11, it can be prevented that the first low-temperature-side refrigerant having an excessive degree of superheating is sucked into the first low-temperature-side compressor 11. Thus, thermal decomposition of the first low-temperature-side refrigerant and burnout of the first low-temperature-side compressor 11 can be prevented, to thereby improve stability in temperature control. Above all, when cooling by the first temperature control device 1 is performed after heating by the second temperature control device 101 has been performed, there is a high possibility that the first low-temperature-side refrigerant, which was heat-exchanged in the first low-temperature-side evaporator 14 of the first temperature control device 1, has an excessive degree of superheating. However, such a first low-temperature-side refrigerant can be prevented from being sucked into the first low-temperature-side compressor 11. Thus, excellent stability in temperature control in the system using both the first temperature control device 1 and the second temperature control device 101 can be ensured.

In addition, in this embodiment, since the refrigeration capacity of the high-temperature-side refrigerant can be increased by the supercooling heat exchanger SC, the adjustment range of the refrigeration capacity can be enlarged. In addition, since the high-temperature-side refrigerant discharged from the supercooling heat exchanger SC can be bypassed through the injection circuit 120, the temperature of the high-temperature-side refrigerant of a high temperature, which is bypassed to the downstream side of the high-temperature-side evaporator 114 through the hot gas circuit 124, can be effectively lowered. Above all, when heating by the second temperature control device 101 is performed after cooling by the first temperature control device 1 has been performed, in the absence of the supercooling heat exchanger SC, there is a high possibility that the high-temperature-side refrigerant, which is heat-exchanged with the high-temperature-side brine in the high-temperature-side evaporator 114 of the second temperature control device 101, cannot sufficiently ensure a degree of superheating so that the refrigeration capacity is lowered. However, since there exists the supercooling heat exchanger SC, the refrigeration capacity can be compensated. Thus, undesired lowering of the refrigeration capacity in the high-temperature-side evaporator 114 can be prevented, whereby excellent stability in temperature control in the system using both the first temperature control device 1 and the second temperature control device 101 can be ensured.

In addition, since the low-temperature-side refrigeration device 2 is a two-way refrigeration device, as compared with a low-temperature-side refrigeration device of a one-way type, the low-temperature-side refrigeration device 2 can have a higher refrigeration capacity, and a controllable temperature range can be enlarged by increasing a range of an adjustable refrigeration capacity. Thus, versatility of the temperature control system can be enhanced.

Although the embodiment of the present invention has been described above, the present invention is not limited to the aforementioned embodiment. For example, in the above embodiment, the low-temperature-side refrigeration device 2 is a two-way refrigeration device, but it may be a one-way refrigeration device or a three-way refrigeration device. In addition, in the above embodiment, although the temperature control system 200 cools or heats a space, the temperature control system 200 may be made as a device for cooling or heating an object that is in direct or indirect contact with the first evaporator 14 or the load units 135A and 135B.

In addition, each of the brine circulation devices 3 and 103 are equipped with a plurality of heating units, but the number of heating unit(s) is not specifically limited. In addition, in the above embodiment, the refrigerant having flown through the supercooling bypass flow path 117 merges with the high-temperature-side refrigerant which has passed through the high-temperature-side evaporator 114 and is compressed by the high-temperature-side compressor 111, during the compression of the high-temperature-side refrigerant by the high-temperature-side compressor 111. However, in place thereof, the high-temperature-side refrigerant having flown through the supercooling bypass flow path 117 may flow into a portion of the high-temperature-side refrigeration circuit 110, which is positioned on the upstream side of the high-temperature-side compressor 111 and on the downstream side of the high-temperature-side evaporator 114 to merge with the high-temperature-side refrigerants from the injection circuit 120 and the hot gas circuit 124, and thereafter may be compressed by the high-temperature-side compressor 111.

1 First temperature control device
2 Low-temperature-side refrigeration device
3 Low-temperature-side brine circulation device
10 First low-temperature-side refrigeration circuit
11 First low-temperature-side compressor
12 First low-temperature-side condenser
13 First low-temperature-side expansion valve
14 First low-temperature-side evaporator
30 Low-temperature-side brine circulation device
31 Low-temperature-side brine circulation path
32 Low-temperature-side heating unit
101 Second temperature control device
102 High-temperature-side refrigeration device
103 High-temperature-side brine circulation device
110 High-temperature-side refrigeration circuit
111 High-temperature-side compressor
112 High-temperature-side condenser
113 High-temperature-side expansion valve
114 High-temperature-side evaporator
116 Supercooling circuit
117 Supercooling bypass flow path
118 Supercooling control valve
120 Injection circuit
121 Injection flow path
122 Injection valve
124 Hot gas circuit
125 Hot-gas flow path
126 Hot gas valve
131 High-temperature-side brine circulation path
132 High-temperature-side main heating unit
134A First high-temperature-side sub heating unit
134B Second high-temperature-side sub heating unit
135A First load unit
135B Second load unit
200 Temperature control system
CC Cascade condenser
FC Refrigeration capacity adjustment mechanism
IC Internal heat exchanger
S Temperature controlled space
SC Supercooling heat exchanger
HC Heating capacity adjustment heat exchanger

The invention claimed is:

1. A temperature control system that controls a temperature of a temperature controlled space or a temperature controlled object, the temperature control system comprising a first temperature control device and a second temperature control device, wherein:
the first temperature control device includes a low-temperature-side refrigeration device and a low-temperature-side brine circulation device;
the first low-temperature-side refrigeration device includes a first low-temperature-side refrigeration circuit in which a first low-temperature-side compressor, a first low-temperature-side condenser, a first low-temperature-side expansion valve and a first low-temperature-side evaporator are connected such that a first low-temperature-side refrigerant is circulated therethrough in this order;
the low-temperature-side brine circulation device includes a low-temperature-side brine circulation path for circulating a low-temperature-side brine, and a low-temperature-side heating unit that constitutes a part of the low-temperature-side brine circulation path and is capable of heating the low-temperature-side brine received therein;
a portion of the first low-temperature-side refrigeration circuit, which is positioned on the downstream side of the first low-temperature-side expansion valve and on the upstream side of the first low-temperature-side evaporator, and a portion of the low-temperature-side brine circulation path, which is positioned on the downstream side of the low-temperature-side heating unit, constitute a refrigeration capacity adjustment mechanism in which they can exchange heat with each other;
the first low-temperature-side evaporator is capable of causing the first low-temperature-side refrigerant flowing through the first low-temperature-side evaporator to absorb heat of the temperature controlled space or the temperature controlled object;
the second temperature control device includes a high-temperature-side refrigeration device and a high-temperature-side brine circulation device;
the high-temperature-side refrigeration device includes:
a high-temperature-side refrigeration circuit in which a high-temperature-side compressor, a high-temperature-side condenser, a high-temperature-side expansion valve and a high-temperature-side evaporator are connected such that a high-temperature-side refrigerant is circulated therethrough in this order;

an injection circuit which includes: an injection flow path that communicates a portion of the high-temperature-side refrigeration circuit, which is positioned on the downstream side of the high-temperature-side condenser and on the upstream side of the high-temperature-side expansion valve, and a portion of the high-temperature-side refrigeration circuit, which is positioned on the downstream side of the high-temperature-side evaporator and on the upstream side of the high-temperature-side compressor, such that the high-temperature-side refrigerant can flow therethrough; and an injection valve capable of adjusting a flow rate of the high-temperature-side refrigerant flowing through the injection flow path; and a hot gas circuit which includes: a hot-gas flow path that communicates a portion of the high-temperature-side refrigeration circuit, which is positioned on the downstream side of the high-temperature-side compressor and on the upstream side of the high-temperature-side condenser, and a portion of the injection fluid path, which is positioned on the downstream side of the injection valve, such that the high-temperature-side refrigerant can flow therethrough; and a hot gas valve capable of adjusting a flow rate of the high-temperature-side refrigerant flowing through the hot-gas flow path;

the high-temperature-side brine circulation device includes: a high-temperature-side brine circulation path for circulating a high-temperature-side brine; a high-temperature-side heating unit that constitutes a part of the high-temperature-side brine circulation path and is capable of heating the high-temperature-side brine received therein; and a load unit that constitutes a part of the high-temperature-side brine circulation path on the downstream side of the high-temperature-side heating unit, and is capable of causing heat of the high-temperature-side brine received therein to be released to the temperature controlled space or the temperature controlled object, or is capable of causing the high-temperature-side brine to absorb heat of the temperature controlled space or the temperature controlled object; and a part of the high-temperature-side brine circulation path and the high-temperature-side evaporator of the high-temperature-side refrigeration device constitute a heating capacity adjustment heat exchanger in which they can exchange heat with each other.

2. The temperature control system according to claim 1, further comprising a control unit that controls the first temperature control device and the second temperature control device, wherein:

when the temperature of the temperature controlled space or the temperature controlled object is controlled to a desired temperature in a low temperature range, the control unit causes the first low-temperature-side refrigerant to be circulated in the low-temperature-side refrigeration device, causes the low-temperature-side brine to be circulated in the low-temperature-side brine circulation device and causes the high-temperature-side brine to be circulated in the high-temperature-side brine circulation device, while the control unit does not cause the high-temperature-side refrigerant to be circulated in the high-temperature-side refrigeration device;

when the temperature of the temperature controlled space or the temperature controlled object is controlled to a desired temperature in a middle temperature range that is set higher than the low temperature range, the control unit does not cause the first low-temperature-side refrigerant to be circulated in the low-temperature-side refrigeration device and does not cause the low-temperature-side brine to be circulated in the low-temperature-side brine circulation device, while the control unit causes the high-temperature-side refrigerant to be circulated in the high-temperature-side refrigeration device and causes the high-temperature-side brine to be circulated in the high-temperature-side brine circulation device; and when the temperature of the temperature controlled space or the temperature controlled object is controlled to a desired temperature in a high temperature range that is set higher than the middle temperature range, the control unit does not cause the first low-temperature-side refrigerant to be circulated in the low-temperature-side refrigeration device and does not cause the low-temperature-side brine to be circulated in the low-temperature-side brine circulation device, while the control unit causes the high-temperature-side refrigerant to be circulated in the high-temperature-side refrigeration device, and causes the high-temperature-side brine to be circulated in the high-temperature-side brine circulation device, with increasing a flow rate of the high-temperature-side brine to be circulated in the high-temperature-side brine circulation device as compared with a flow rate in the case of the middle temperature range.

3. The temperature control system according to claim 1, wherein:

in the first temperature control device, a portion of the first low-temperature-side refrigeration circuit, which is positioned on the downstream side of the first low-temperature-side expansion valve and on the upstream side of the first low-temperature-side evaporator, and a portion of the first low-temperature-side refrigeration circuit, which is positioned on the downstream side of the first low-temperature-side evaporator and on the upstream side of the first low-temperature-side compressor, constitute an internal heat exchanger in which they can exchange heat with each other; and the internal heat exchanger is located on the upstream side of the refrigeration capacity adjustment mechanism in a direction along which the first low-temperature-side refrigerant flows.

4. The temperature control system according to claim 1, wherein:

the second temperature control device further includes a supercooling circuit which includes: a supercooling bypass flow path that communicates a portion of the high-temperature-side refrigeration circuit, which is positioned on the downstream side of the high-temperature-side condenser and on the upstream side of a position connected to the injection flow path, and a portion of the high-temperature-side refrigeration circuit, which is positioned on the high-temperature-side compressor or on the upstream side of the high-temperature-side compressor and on the downstream side of the high-temperature-side evaporator, such that the high-temperature-side refrigerant can flow therethrough; and a supercooling control valve that controls a flow rate of the refrigerant flowing through the supercooling bypass flow path; and a portion of the supercooling bypass flow path, which is positioned on the downstream side of the supercooling control valve, and a portion of the high-temperature-side refrigeration circuit, which is positioned on the downstream side of a position connected to the supercooling bypass flow path and on the upstream side of a position connected to the injection flow path, constitute a supercooling heat exchanger in which they can exchange heat with each other.

5. A temperature control device comprising:
a refrigeration device including a first refrigeration circuit in which a first compressor, a first condenser, a first expansion valve and a first evaporator are connected such that a first refrigerant is circulated therethrough in this order; and
a brine circulation device including a brine circulation path for circulation a brine, and a heating unit that constitutes a part of the brine circulation path and is capable heating the brine received therein;
wherein a portion of the first refrigeration circuit, which is positioned on the downstream side of the first expansion valve and on the upstream side of the first evaporator, and a portion of the brine circulation path, which is positioned on the downstream side of the heating unit, constitute a refrigeration capacity adjustment mechanism in which they can exchange heat with each other.

6. The temperature control device according to claim 5, wherein:
a portion of the first refrigeration circuit, which is positioned on the downstream side of the first expansion valve and on the upstream side of the first evaporator, and a portion of the first refrigeration circuit, which is positioned on the downstream side of the first evaporator and on the upstream side of the first compressor, constitute an internal heat exchanger in which they can exchange heat with each other; and
the internal heat exchanger is located on the upstream side of the refrigeration capacity adjustment mechanism in a direction along which the first refrigerant flows.

7. The temperature control device according to claim 5, wherein:
the refrigeration device is a two-way refrigeration device, and further includes a second refrigeration circuit in which a second compressor, a second condenser, a second expansion valve and a second evaporator are connected such that a second refrigerant is circulated therethrough in this order; and
the first condenser and the second evaporator constitute a cascade condenser in which they can exchange heat with each other.

8. A refrigeration device comprising:
a refrigeration circuit in which a compressor, a condenser, an expansion valve and an evaporator are connected such that a refrigerant is circulated therethrough in this order;
an injection circuit which includes: an injection flow path that communicates a portion of the refrigeration circuit, which is positioned on the downstream side of the condenser and on the upstream side of the expansion valve, and a portion of the refrigeration circuit, which is positioned on the downstream side of the evaporator and on the upstream side of the compressor, such that the refrigerant can flow therethrough; and an injection valve capable of adjusting a flow rate of the refrigerant flowing through the injection flow path; and
a hot gas circuit which includes: a hot-gas flow path that communicates a portion of the refrigeration circuit, which is positioned on the downstream side of the compressor and on the upstream side of the condenser, and a portion of the injection flow path, which is positioned on the downstream side of the injection valve, such that the refrigerant can flow therethrough; and a hot gas valve capable of adjusting a flow rate of the refrigerant flowing through the hot-gas flow path.

9. The refrigeration device according to claim 8, further comprising a supercooling circuit which includes: a supercooling bypass flow path that communicates a portion of the refrigeration circuit, which is positioned on the downstream side of the condenser and on the upstream side of a position connected to the injection flow path, and a portion of the refrigeration circuit, which is positioned on the compressor or on the upstream side of the compressor and on the downstream side of the evaporator, such that the refrigerant can flow therethrough; and a supercooling control valve that controls a flow rate of the refrigerant flowing through the supercooling bypass flow path;
wherein a portion of the supercooling bypass flow path, which is positioned on the downstream side of the supercooling control valve, and a portion of the refrigeration circuit, which is positioned on the downstream side of a position connected to the supercooling bypass flow path and on the upstream side of a position connected to the injection flow path, constitute a supercooling heat exchanger in which they can exchange heat with each other.

10. The refrigeration device according to claim 8, further comprising a control unit that controls an opening degree of the injection valve and an opening degree of the hot gas valve,
wherein the control unit adjusts a flow rate of the refrigerant to flow into the evaporator by adjusting the opening degree of the injection valve and the opening degree of the hot gas valve based on a set target refrigeration capacity, thereby causing the evaporator to output the target refrigeration capacity.

11. The refrigeration device according to claim 10, further comprising:
a temperature sensor that detects a temperature of the refrigerant before it flows into the compressor from the downstream side of the evaporator; and
a pressure sensor that detects a pressure of the refrigerant before it flows into the compressor from the downstream side of the evaporator;
wherein the control unit adjusts the opening degree of the injection valve and the opening degree of the hot gas valve based on the temperature detected by the temperature sensor and the pressure detected by the pressure sensor, such that the refrigerant to flow into the compressor is in a gas phase and has a temperature not more than a predetermined one.

12. A temperature control device comprising:
the refrigeration device according to claim 8; and
a brine circulation device which includes: a brine circulation path for circulating a brine; a heating unit that constitutes a part of the brine circulation path and is capable of heating the brine received therein; and a load unit that constitutes a part of the brine circulation path on the downstream side of the heating unit, and is capable of causing heat of the brine received therein to be released or is capable of causing the brine to absorb heat;
wherein a part of the brine circulation path and the evaporator of the refrigeration device constitute a heating capacity adjustment heat exchanger in which they can exchange heat with each other.

\* \* \* \* \*